US011546933B2

(12) United States Patent
Fakoorian et al.

(10) Patent No.: US 11,546,933 B2
(45) Date of Patent: Jan. 3, 2023

(54) CROSS CARRIER SHARED CHANNEL REPETITION

(71) Applicant: QUALCOMM Incorporated, San Diego, CA (US)

(72) Inventors: Seyed Ali Akbar Fakoorian, San Diego, CA (US); Wanshi Chen, San Diego, CA (US); Seyedkianoush Hosseini, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 108 days.

(21) Appl. No.: 16/951,438

(22) Filed: Nov. 18, 2020

(65) Prior Publication Data
US 2021/0160912 A1 May 27, 2021

Related U.S. Application Data

(60) Provisional application No. 62/941,631, filed on Nov. 27, 2019.

(51) Int. Cl.
*H04W 4/00* (2018.01)
*H04W 72/12* (2009.01)
(Continued)

(52) U.S. Cl.
CPC .......... *H04W 72/1289* (2013.01); *H04L 1/08* (2013.01); *H04W 72/0453* (2013.01)

(58) Field of Classification Search
CPC ......... H04W 72/1289; H04W 72/0453; H04W 72/0446; H04L 1/08; H04L 5/0007;
(Continued)

(56) References Cited

U.S. PATENT DOCUMENTS

2018/0270851 A1* 9/2018 Bhattad ............ H04W 72/0446
2018/0287843 A1* 10/2018 Chen ................ H04L 27/26025
(Continued)

FOREIGN PATENT DOCUMENTS

EP          3637909 A1    4/2020
WO    WO-2018208087 A1   11/2018

OTHER PUBLICATIONS

Huawei, et al., "TB Repetition for HRLLC", 3GPP TSG-RAN WG2 Meeting #103, 3GPP Draft; R2-1812076 TB Repetition for HRLLC, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 20, 2018-Aug. 24, 2018, Aug. 9, 2018 (Aug. 9, 2018), 2 Pages, XP051521699, Retrieved from the Internet: URL: http://www.3gpp.org/ftp/tsg%5Fran/WG2%5FRL2/TSGR2%5F103/Docs/R2%2D1812076%2Ezip [retrieved on Aug. 9, 2018] the whole document.
(Continued)

*Primary Examiner* — Chuong T Ho
(74) *Attorney, Agent, or Firm* — Holland & Hart LLP

(57) ABSTRACT

Methods, systems, and devices for wireless communications are described. Techniques are described herein for cross component carrier (CC) shared channel repetition. The method for wireless communications may include identifying a set of CCs supported by a user equipment (UE) for communications with a base station. A UE may receive a downlink control message from the base station that schedules multiple repetitions of a transport block for the UE, where a first repetition of the multiple repetitions is scheduled on a first CC of the set of CCs and a second repetition of the multiple repetitions is scheduled on a second CC of the set of CCs. The method may also include transmitting or receiving the first repetition via the first CC and the second repetition via the second CC.

30 Claims, 20 Drawing Sheets

(51) Int. Cl.
*H04L 1/08* (2006.01)
*H04W 72/04* (2009.01)

(58) Field of Classification Search
CPC ..... H04L 1/0026; H04L 1/189; H04L 1/1893;
H04L 1/1896; H04L 5/001; H04L 5/0055;
H04L 5/0092; H04L 5/1469
USPC .................................................. 370/329, 330
See application file for complete search history.

(56) References Cited

U.S. PATENT DOCUMENTS

| | | | |
|---|---|---|---|
| 2019/0215104 A1* | 7/2019 | Salem | H04L 1/1893 |
| 2020/0146039 A1* | 5/2020 | Takeda | H04W 74/08 |
| 2020/0281003 A1* | 9/2020 | Luo | H04L 5/0094 |
| 2021/0144700 A1* | 5/2021 | Lee | H04W 72/0413 |
| 2021/0352501 A1* | 11/2021 | Taherzadeh Boroujeni | |
| | | | H04W 24/08 |
| 2022/0200736 A1* | 6/2022 | Cirik | H04L 5/0094 |

OTHER PUBLICATIONS

International Search Report and Written Opinion—PCT/US2020/061224—ISA/EPO—dated Feb. 25, 2021.

\* cited by examiner

CROSS CARRIER SHARED CHANNEL REPETITION

CROSS REFERENCE

The present Application for Patent claims the benefit of U.S. Provisional Patent Application No. 62/941,631 by FAKOORIAN et al., entitled "CROSS CARRIER SHARED CHANNEL REPETITION," filed Nov. 27, 2019, assigned to the assignee hereof, and expressly incorporated by reference herein.

FIELD OF TECHNOLOGY

The following relates generally to wireless communications and more specifically to cross carrier shared channel repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Control information for a UE may be used to schedule uplink or downlink transmissions between the UE and a base station. The control information may schedule transmissions via a component carrier (CC) configured for uplink communications or downlink communications. Such control information, however, may be limited in flexibility for scheduling via multiple CCs, which may result in reduced throughput or increased signaling overhead.

SUMMARY

The described techniques relate to improved methods, systems, devices, and apparatuses that support cross carrier shared channel repetition. Generally, the described techniques provide for scheduling, using a single downlink control information (DCI), multiple transmissions or repetitions of a transport block over different component carriers (CCs). The scheduling of the transport block(s) may be indicated statically or dynamically by the DCI and the time resources scheduled for transmission of the transport block(s) may differ between CCs. Further, the scheduling across multiple CCs may be based on factors such as nominal number of repetitions of the transport block(s), nominal length of the transport block(s) per repetition, a start and length indicator (SLIV) associated with the transport block(s), among others, for example.

A method of wireless communications at a user equipment (UE) is described. The method may include identifying a set of CCs supported by the UE for communications with a base station, receiving a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmitting or receiving the first repetition via the first CC and the second repetition via the second CC.

An apparatus for wireless communications at a UE is described. The apparatus may include a processor, memory coupled with the processor, and instructions stored in the memory. The instructions may be executable by the processor to cause the apparatus to identify a set of CCs supported by the UE for communications with a base station, receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC.

Another apparatus for wireless communications at a UE is described. The apparatus may include means for identifying a set of CCs supported by the UE for communications with a base station, receiving a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmitting or receiving the first repetition via the first CC and the second repetition via the second CC.

A non-transitory computer-readable medium storing code for wireless communications at a UE is described. The code may include instructions executable by a processor to identify a set of CCs supported by the UE for communications with a base station, receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC.

Some examples of the method, apparatuses, and non-transitory computer-readable medium described herein may further include operations, features, means, or instructions for receiving an indication that the multiple repetitions of the transport block may be scheduled via the first and second CCs according to one or both of a frequency division multiplexing (FDM) scheme or a time division multiplexing (TDM) scheme.

In some examples of the method, apparatuses, and non-transitory computer-readable medium described herein, the indication may be received via radio resource control (RRC) signaling, a medium access control (MAC) control element (MAC-CE), or DCI.

Some examples of the method, apparatuses, and non-transitory computer-readable medium described herein may further include operations, features, means, or instructions for receiving an indication of a subset of the set of CCs available for the multiple repetitions of the transport block, the subset including at least the first CC and the second CC, where the indication may be received via RRC signaling, a MAC-CE, or DCI.

In some examples of the method, apparatuses, and non-transitory computer-readable medium described herein, the indication includes a set of carrier indices that corresponds to the subset of the set of CCs.

Some examples of the method, apparatuses, and non-transitory computer-readable medium described herein may further include operations, features, means, or instructions for receiving an indication of at least one CC of the set of CCs to be dropped for the multiple repetitions of the transport block.

Some examples of the method, apparatuses, and non-transitory computer-readable medium described herein may further include operations, features, means, or instructions for receiving an indication of a starting CC for the multiple repetitions of the transport block.

Some examples of the method, apparatuses, and non-transitory computer-readable medium described herein may further include operations, features, means, or instructions for transmitting feedback for a subset of the set of CCs, and receiving an indication of a starting CC for the multiple repetitions of the transport block based on the feedback, where the subset includes the starting CC.

In some examples of the method, apparatuses, and non-transitory computer-readable medium described herein, the feedback indicates acknowledgement (ACK)/negative ACK (NACK) feedback or a signal to interference plus noise ratio (SINR) for each CC of the sub set.

Some examples of the method, apparatuses, and non-transitory computer-readable medium described herein may further include operations, features, means, or instructions for receiving, via RRC signaling, a reference subcarrier spacing configuration for each of a subset of the set of CCs, and determining a number of symbols between the downlink control message and transmission or reception of the first repetition via the first CC based on the reference subcarrier spacing configuration.

In some examples of the method, apparatuses, and non-transitory computer-readable medium described herein, the number of symbols may be based on a minimum or a maximum slot format indicator of the subset, an indication within the downlink control message, a subcarrier spacing of the first CC, or a subcarrier spacing associated with the downlink control message.

Some examples of the method, apparatuses, and non-transitory computer-readable medium described herein may further include operations, features, means, or instructions for determining a first number of symbols between the downlink control message and transmission or reception of the first repetition via the first CC based on a subcarrier spacing of the first CC, and determining a second of symbols between the downlink control message and transmission or reception of the second repetition via the second CC based on a subcarrier spacing of the second CC.

Some examples of the method, apparatuses, and non-transitory computer-readable medium described herein may further include operations, features, means, or instructions for receiving, via RRC signaling, a reference subcarrier spacing configuration for each of a subset of the set of CCs, and determining a slot for transmission or reception of the first repetition via the first CC based on the reference subcarrier spacing configuration.

Some examples of the method, apparatuses, and non-transitory computer-readable medium described herein may further include operations, features, means, or instructions for determining a first slot for transmission or reception of the first repetition via the first CC based on a subcarrier spacing of the first CC, and determining a second slot for transmission or reception of the second repetition via the second CC based on a subcarrier spacing of the second CC.

Some examples of the method, apparatuses, and non-transitory computer-readable medium described herein may further include operations, features, means, or instructions for receiving, via RRC signaling, a reference subcarrier spacing configuration for each of a subset of the set of CCs, and determining a starting symbol and length in time for transmission or reception of the first repetition via the first CC based on the reference subcarrier spacing configuration, where the starting symbol and length in time may be the same for the first CC and the second CC.

Some examples of the method, apparatuses, and non-transitory computer-readable medium described herein may further include operations, features, means, or instructions for determining a number of symbols for transmission or reception of the first repetition via the first CC, where the number of symbols may be the same for the first CC and the second CC.

Some examples of the method, apparatuses, and non-transitory computer-readable medium described herein may further include operations, features, means, or instructions for determining a transport block size for transmission or reception of the first repetition via the first CC based on a nominal length in time and a nominal set of resource elements indicated by the downlink control message, where the transport block size may be the same for the first CC and the second CC.

Some examples of the method, apparatuses, and non-transitory computer-readable medium described herein may further include operations, features, means, or instructions for determining a transport block size for transmission or reception of the first repetition via the first CC based on a nominal set of resource elements for the first CC and the second CC.

A method of wireless communications at a base station is described. The method may include identifying a set of CCs supported by a UE for communications with the base station, transmitting a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmitting or receiving the first repetition via the first CC and the second repetition via the second CC.

An apparatus for wireless communications at a base station is described. The apparatus may include a processor, memory coupled with the processor, and instructions stored in the memory. The instructions may be executable by the processor to cause the apparatus to identify a set of CCs supported by a UE for communications with the base station, transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC.

Another apparatus for wireless communications at a base station is described. The apparatus may include means for identifying a set of CCs supported by a UE for communications with the base station, transmitting a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmitting or receiving the first repetition via the first CC and the second repetition via the second CC.

A non-transitory computer-readable medium storing code for wireless communications at a base station is described. The code may include instructions executable by a processor to identify a set of CCs supported by a UE for communications with the base station, transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC.

Some examples of the method, apparatuses, and non-transitory computer-readable medium described herein may further include operations, features, means, or instructions for transmitting an indication that the multiple repetitions of the transport block may be scheduled via the first and second CCs according to one or both of a FDM scheme or a TDM scheme.

In some examples of the method, apparatuses, and non-transitory computer-readable medium described herein, the indication may be transmitted via RRC signaling, a MAC-CE, or DCI.

Some examples of the method, apparatuses, and non-transitory computer-readable medium described herein may further include operations, features, means, or instructions for transmitting an indication of a subset of the set of CCs available for the multiple repetitions of the transport block, the subset including at least the first CC and the second CC, where the indication may be transmitted via RRC signaling, a MAC-CE, or DCI.

In some examples of the method, apparatuses, and non-transitory computer-readable medium described herein, the indication includes a set of carrier indices that corresponds to the subset of the set of CCs.

Some examples of the method, apparatuses, and non-transitory computer-readable medium described herein may further include operations, features, means, or instructions for transmitting an indication of at least one CC of the set of CCs to be dropped for the multiple repetitions of the transport block.

Some examples of the method, apparatuses, and non-transitory computer-readable medium described herein may further include operations, features, means, or instructions for transmitting an indication of a starting CC for the multiple repetitions of the transport block.

Some examples of the method, apparatuses, and non-transitory computer-readable medium described herein may further include operations, features, means, or instructions for receiving, from the UE, feedback for a subset of the set of CCs, and transmitting an indication of a starting CC for the multiple repetitions of the transport block based on the feedback, where the subset includes the starting CC.

In some examples of the method, apparatuses, and non-transitory computer-readable medium described herein, the feedback indicates ACK/NACK feedback or a SINR for each CC of the subset.

Some examples of the method, apparatuses, and non-transitory computer-readable medium described herein may further include operations, features, means, or instructions for transmitting, via RRC signaling, a reference subcarrier spacing configuration for each of a subset of the set of CCs, scheduling transmission or reception of the first repetition via the first CC based on the reference subcarrier spacing configuration, and scheduling transmission or reception of the second repetition via the second CC based on the reference subcarrier spacing configuration.

Some examples of the method, apparatuses, and non-transitory computer-readable medium described herein may further include operations, features, means, or instructions for scheduling transmission or reception of the first repetition via the first CC based on a first subcarrier spacing configuration associated with the first CC, and scheduling transmission or reception of the second repetition via the second CC based on a second subcarrier spacing configuration associated with the second CC.

Some examples of the method, apparatuses, and non-transitory computer-readable medium described herein may further include operations, features, means, or instructions for scheduling transmission or reception of the first repetition via the first CC based on a subcarrier spacing configuration associated with the downlink control message.

DETAILED DESCRIPTION

Downlink control information (DCI) may be used by a base station to schedule one or more transport blocks for a user equipment (UE) as part of an uplink or downlink data transmission, which may be transmitted via an uplink data channel (e.g., a physical uplink shared channel (PUSCH)) or a downlink data channel (e.g., a physical downlink shared channel (PDSCH)) scheduled by the DCI. Additionally, the uplink or downlink may be scheduled by the DCI across more than one component carrier (CC). For example, a base station may schedule multiple transmissions or repetitions of a transport block using cross CC shared channel repetition such that DCI is transmitted via a first CC and schedules transmissions via multiple other CCs different from the first CC.

Techniques are described herein for cross CC shared channel repetition using a single DCI. The techniques may facilitate scheduling one or more transport blocks across multiple CCs for uplink communications or downlink communications. Multiple transmission or repetitions of the one or more transport blocks across the multiple CCs may be scheduled using a single DCI. Additionally, the scheduling of the transport blocks may be indicated statically or dynamically by the DCI based on factors associated with the CCs, the transport blocks, the UE, or the base station, among others.

Aspects of the disclosure are initially described in the context of wireless communications systems. Aspects of the disclosure are described with reference to a process flow. Aspects of the disclosure are further illustrated by and described with reference to apparatus diagrams, system diagrams, and flowcharts that relate to downlink control information for scheduling one or more transport blocks.

Figure 1:
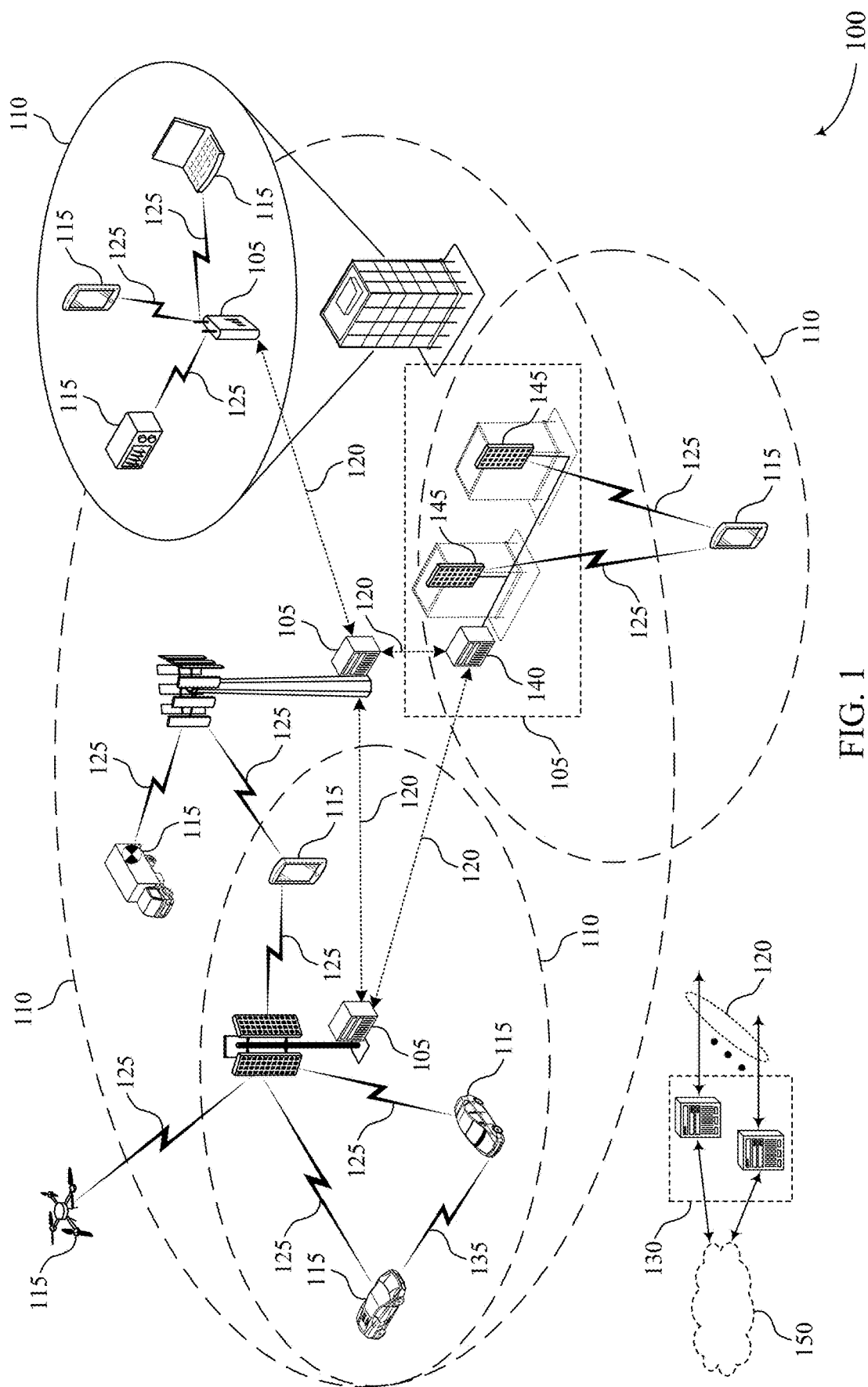
FIGS. 1 through 4 illustrate example wireless communications systems that support cross carrier shared channel repetition in accordance with aspects of the present disclosure.

FIG. 1 illustrates an example of a wireless communications system 100 that supports cross carrier shared channel repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Techniques are described herein for scheduling one or more transport blocks across multiple CCs for uplink communications or downlink communications. Multiple transmission or repetitions of the one or more transport blocks across the multiple CCs may be scheduled using a single DCI. Additionally, the scheduling of the transport blocks may be indicated statically or dynamically by the DCI based on a plurality of factors associated with the CCs, the transport blocks, the UE, or the base station, among other factors.

As such, the wireless communications system 100 may more efficiently utilize transmission or reception resources available to a base station 105 and a UE 115 to transmit or receive one or more transport blocks as scheduled by a DCI. Such features may improve signaling efficiency and reduce latency by increasing a number of CCs available to transmission or reception at a given time and by facilitating efficient determination of scheduling of the transport blocks using a single DCI. In some examples, scheduling repetitions of one or more transport blocks across multiple CCs may improve the coverage area available for transmission and reception between the base station 105 and the UE 115.

In some examples, scheduling the repetitions or transmission of the one or more transport blocks across multiple CCs using a single DCI may reduce a power consumption of the UE 115 when communicating with the base station 105. By scheduling repetitions of transport blocks across multiple CCs using a single DCI that may statically or dynamically determine the scheduling of the repetitions, the user experience with the UEs 115 may improve by increased battery life of the UEs 115, increased data throughput, increased transmission and reception availability, and a decreased likelihood that data is lost.

Figure 2:
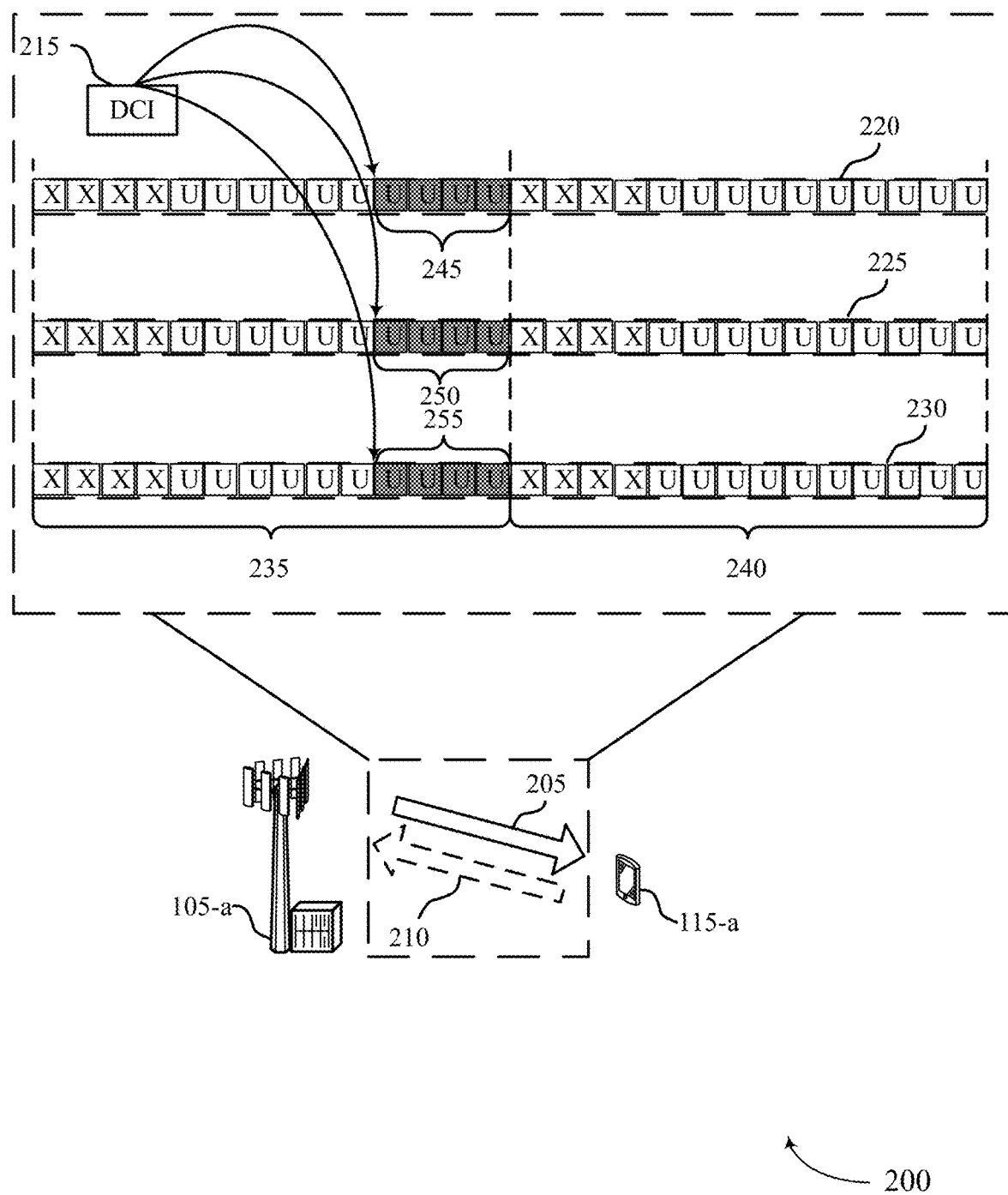

FIG. 2 illustrates an example of a wireless communications system 200 that supports cross CC shared channel repetition in accordance with aspects of the present disclosure. In some examples, the wireless communications system 200 may implement aspects of wireless communication system 100. Wireless communications system 200 may include UE 115-a and base station 105-a, which may be examples of a UE 115 and a base station 105 described with reference to FIG. 1.

In some cases, base station 105-a and UE 115-a may communicate using a downlink link 205 and an uplink link 210. Base station 105-a may transmit DCI to UE 115-a on the downlink link 205 to schedule transmissions. For example, the DCI may schedule resources for base station 105-a for cross CC shared channel repetition on the downlink link 205 to UE 115-a for downlink communications. Or, the DCI may schedule UE 115-a to transmit using cross CC shared channel repetition on the uplink link 210 to base station 105-a for uplink communications. In some cases, cross CC shared channel repetition may be used to carry uplink or downlink data which may be transmitted on an uplink data channel (e.g., a PUSCH) or a downlink data channel (e.g., a PDSCH) scheduled by the DCI.

In some cases, a single DCI transmission may schedule multiple transmission or repetitions of a transport block on different CCs. As illustrated in FIG. 2, DCI 215 may schedule PUSCH repetitions on multiple different CCs. For example, DCI 215 may schedule a first repetition 245 over four symbols on a first CC 220, a second repetition 250 over four symbols on a second CC 225, and a third repetition 255 over four symbols on a third CC 230. In the illustrated example, each of the repetitions occur within a first slot 235 and over overlapping symbols across the CCs.

In some cases, the DCI 215 may support scheduling multiple PDSCH or PUSCH repetitions across one or more of the CCs. For example, the repetitions may be scheduled according to an FDM scheme. When using an FDM scheme, because of intra-band repetitions, the DCI 215 may incorporate power sharing across the CCs as part of scheduled PUSCH repetitions. In some cases, the repetitions may be scheduled according to a TDM scheme. When using a TDM scheme, power sharing is not indicated, however system latency may increase as compared to use of a FDM scheme during scheduled PUSCH repetitions. In some cases, the UE 115-a may be one of configured or dynamically indicated by the DCI 215 to operate using one of the FDM or the TDM scheme, or to perform each repetition on a single CC.

In some cases, the single DCI 215 may indicate which CCs are to be used for each repetition. In some cases, CCs that will be utilized as part of the repetition scheme may be dynamically or semi-statically indicated. In some cases, the CCs may be indicated dynamically via the DCI 215. In such cases, starting with the first CC 220, a carrier indicator field (CIF) may indicate which CC index may be dropped, and following CCs (e.g., CCs to be used) may be indicated by a modulo. In this example, the modulo may be utilize CIF plus k, $N_{cap}$, where k=0, 1, . . . , and $N_{cap}$ is equivalent to a number of configured uplink cells or a number of configured downlink cells for PUSCH or PDSCH repetitions, respectively.

In some cases, the CCs to be involved in scheduled repetitions may be dynamically indicated through the DCI 215 by using an indication from the UE 115-a. For example, as part of a downlink transmission, the UE 115-a may provide a "soft" ACK/NACK, which may yield information related to a SINR or a decodability of each of the CCs. The CIF within the DCI 215 may acknowledge such a suggestion from the UE 115-a and may acknowledge the suggestion by indicating a CC index at the top of a list maintained by the UE 115-a. Additional CCs may be obtained by the modulo from the list maintained by the UE 115-a, the list further containing information related to a ranking of the CCs (e.g., according to an order based on priority, signal quality or other measurements, or other parameters related to the CCs).

Figure 3:
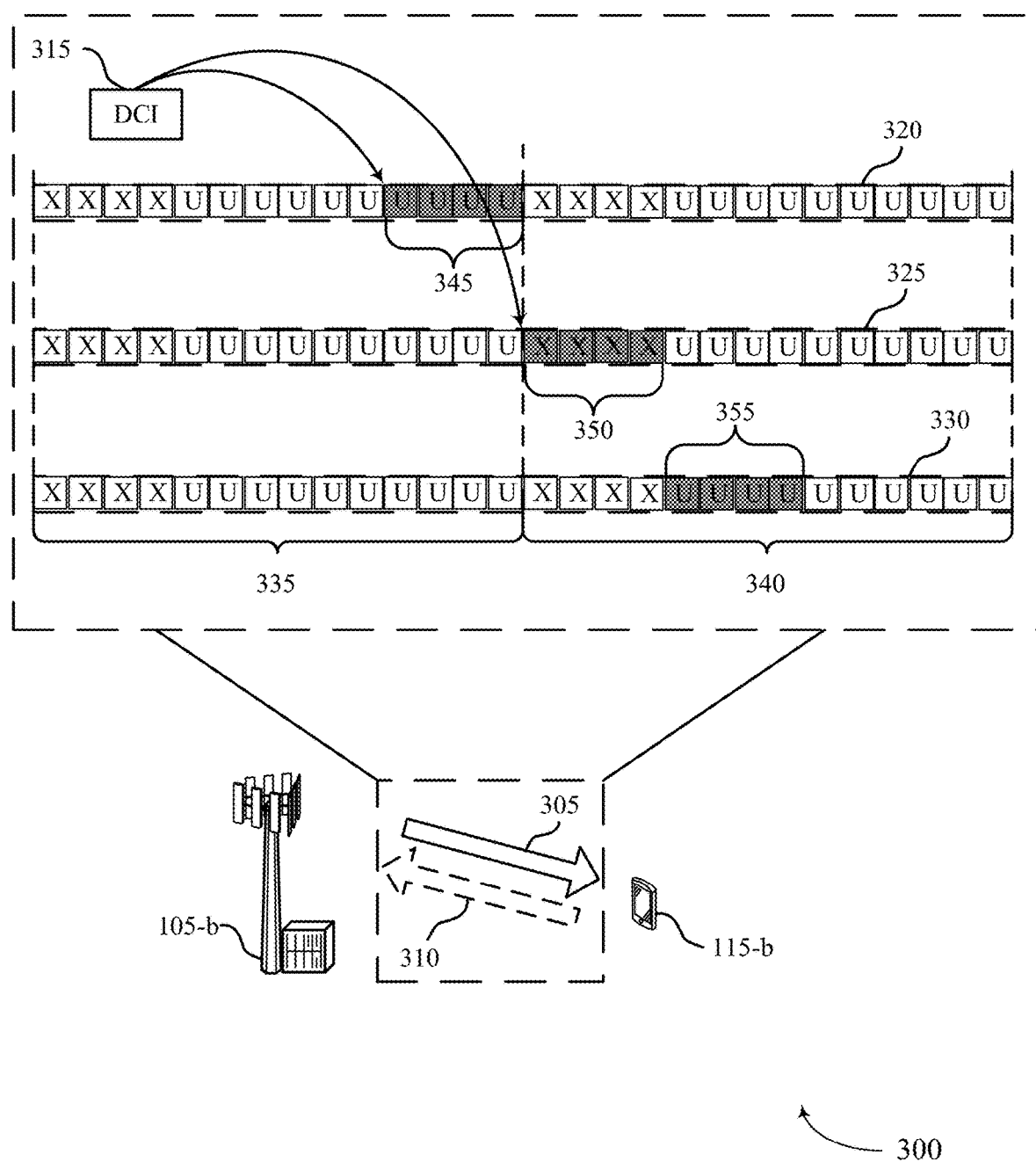

FIG. 3 illustrates an example of a wireless communications system 300 that supports cross CC shared channel repetition in accordance with aspects of the present disclosure. In some examples, the wireless communications system 300 may implement aspects of wireless communications systems 100 or 200. Wireless communications system 300 may include UE 115-b and base station 105-b, which may be examples of a UE 115 and a base station 105 described with reference to FIG. 1.

In some cases, base station 105-b and UE 115-b may communicate using a downlink link 305 and an uplink link 310. Base station 105-b may transmit DCI 315 to UE 115-b on the downlink link 305 to schedule transmissions. For example, the DCI 315 may schedule resources for base station 105-b for cross CC shared channel repetition on the downlink link 305 to UE 115-b for downlink communications. Or, the DCI 315 may schedule UE 115-b to transmit using cross CC shared channel repetition on the uplink link 310 to base station 105-b for uplink communications. In some cases, cross CC shared channel repetition may be used to carry uplink or downlink data which may be transmitted on an uplink data channel (e.g., a PUSCH) or a downlink data channel (e.g., a PDSCH) scheduled by the DCI 315.

In some cases, as illustrated in FIG. 3, a single DCI transmission may schedule multiple transmission or repetitions of a transport block on different CCs. In such cases, DCI 315 may schedule PUSCH repetitions on a multiple different CCs. For example, DCI 315 may schedule a first repetition 345 over four symbols on a first CC 320, a second repetition 350 over four symbols on a second CC 325, and a third repetition 355 over four symbols on a third CC 330. In the illustrated example, the first repetition 345 is positioned within a first slot 235, and second repetition 350 and third repetition 355 are staggered relative to the first repetition and relative to each other within a second slot 340, which consecutively follows the first slot 335 such that none of the repetitions or only a portion of the repetitions overlap in time.

In the example embodiments, a transmission on a single carrier, N2, which is the number of symbols between reception of DCI and transmission of a shared channel scheduled by the DCI, may be based on μ, where μ corresponds to one of μDL or μUL corresponding to a largest $T_{proc,2}$. In such examples, μDL may correspond to a subcarrier spacing of a downlink channel used to transmit a physical downlink control channel (PDCCH) carrying the DCI 215 used for scheduling a PUSCH. Additionally, in such examples, μUL may correspond to a subcarrier spacing of an uplink channel used to transmit a PUSCH.

In some cases, for PUSCH repetitions using differing CCs, N2 for each CC may be obtained. In some cases, μUL may correspond to a reference subcarrier spacing (SCS) configuration. In such cases, the UE 115-b may be provided by a reference SCS configuration for each cell and μUL may be a minimum μUL or a maximum μUL across a configured cell. In some cases, μUL may be determined through the use of a constant, which may be provided by the CIF within the DCI 215. In some cases, the μUL may correspond to a subcarrier spacing of an active uplink BWP of the cell given by the DCI 215. In some cases, μUL may correspond to a subcarrier spacing of a μDL used to transmit a PDCCH that was carrying the DCI 215. In some additional examples, μUL for each cell may correspond to a SCS of one of an active or a default uplink BWP used to transmit the PUSCH.

In some cases, PUSCH repetitions may be on separate and distinct CCs, and a $K_2$ for transmission on each of the CCs may be obtained by a time domain resource allocation (TDRA) based on a numerology. In some cases, determination of the numerology may be given by examining a μPUSCH and $K_2$, which may both correspond to a reference SCS configuration indicating that each repetition may start at the same time. In some cases, μPUSCH and $K_2$ for each cell may correspond to a SCS of one of the active or default UL BWP used to transmit the PUSCH.

For downlink shared channels, PDSCH repetitions may be on separate and distinct CCs, and a $K_0$ for transmission on each of the CCs may be obtained by a TDRA based on a numerology. In some cases, determination of the numerology may be given by examining a μPDSCH and $K_0$, which may both correspond to a reference SCS configuration indicating that each repetition may start at the same time. In some cases, μPDSCH and $K_0$ for each cell may correspond to a SCS of one of the active or default downlink BWP used to transmit the PDSCH.

Figure 4:
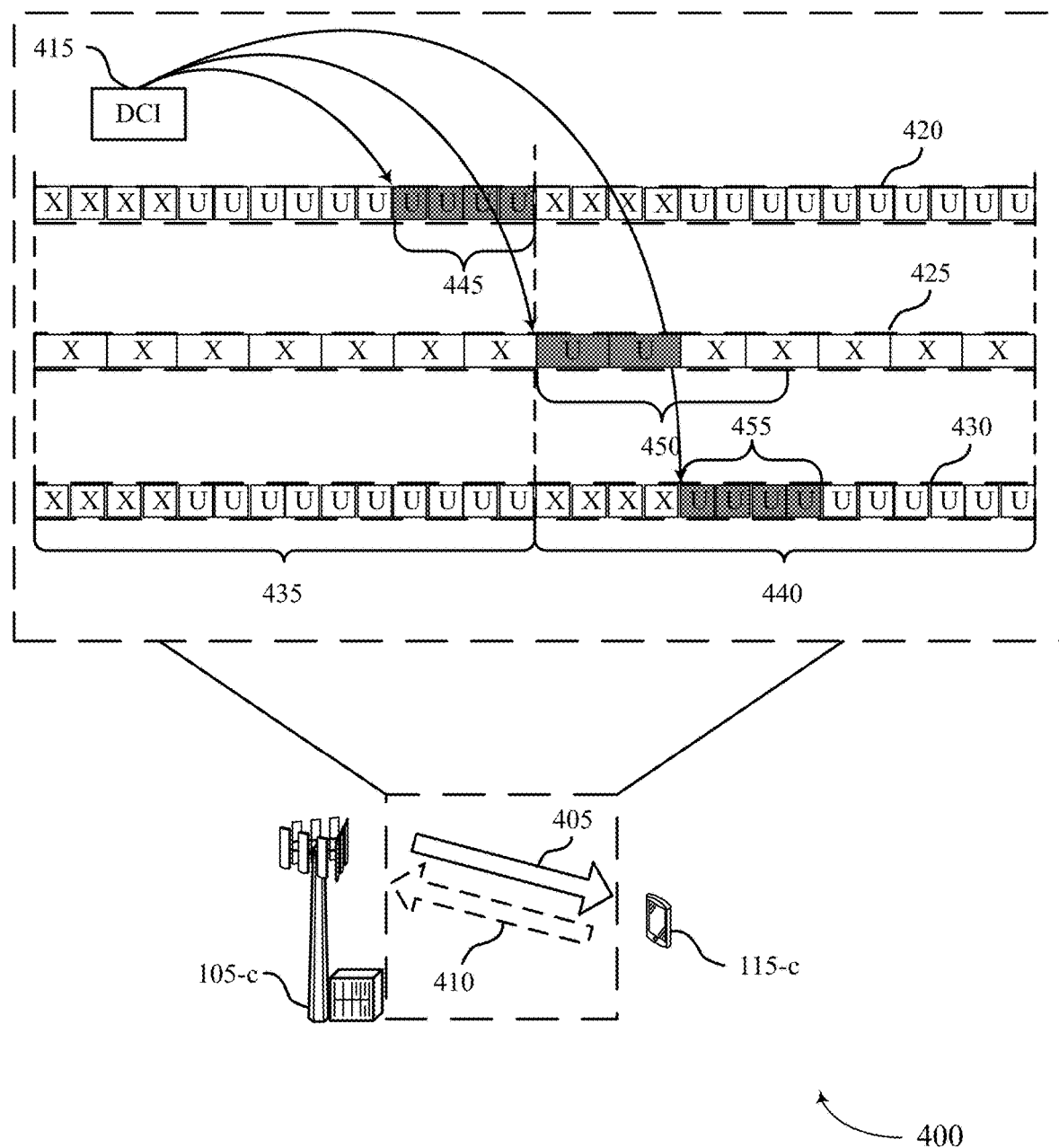

FIG. 4 illustrates an example of a wireless communications system 400 that supports cross CC shared channel repetition in accordance with aspects of the present disclosure. In some examples, the wireless communications system 400 may implement aspects of wireless communications systems 100, 200, or 300. Wireless communications system 400 may include UE 115-c and base station 105-c, which may be examples of a UE 115 and a base station 105 described with reference to FIG. 1.

In this case, base station 105-c and UE 115-c may communicate using a downlink link 405 and an uplink link 410. Base station 105-c may transmit DCI 415 to UE 115-c on the downlink link 405 to schedule transmissions. For example, the DCI 415 may schedule resources for base station 105-c for cross CC shared channel repetition on the downlink link 405 to UE 115-c for downlink communications. Or, the DCI 415 may schedule UE 115-c to transmit using cross CC shared channel repetition on the uplink link 410 to base station 105-c for uplink communications. In some cases, cross CC shared channel repetition may be used to carry uplink or downlink data which may be transmitted on an uplink data channel (e.g., a PUSCH) or a downlink data channel (e.g., a PDSCH) scheduled by the DCI 415.

In some cases, as illustrated in FIG. 4, a single DCI transmission may schedule multiple transmission or repetitions of a transport block on different CCs. In such cases, DCI 415 may schedule PUSCH repetitions on multiple different CCs. For example, DCI 415 may schedule a first repetition 445 over four symbols on a first CC 420, a second repetition 450 over two symbols on a second CC 425, and a third repetition 455 over four symbols on a third CC 430. Here, second CC 425 is configured with a different SCS than first CC 420 and third CC 430, which, as shown, corresponds to a different symbol duration for symbols of the second CC 425 as compared to symbols of the first CC 420 and the third CC 430. In the illustrated example, the first repetition 445 is positioned within a first slot 435, and second repetition 450 and third repetition 455 are positioned relative to each other within a second slot 440, which immediately adjoins the first slot 435, such that the second repetition 450 at least partially overlaps the third repetition 455.

In some cases, when each of the repetitions occur on separate CCs, a SLIV indicated by a single DCI may represent a number of symbols and nominal transmission time on a reference SCS. In such cases, the reference SCS may be determined using methods described herein. In some examples, each CC of the plurality of CCs may transmit using the same absolute time, i.e., the number of symbols for each CC will vary based on symbol duration and SCS of the respective CC. That is, repetitions scheduled on each CC may span a same duration in time, but may be scheduled over different numbers of symbols for one or more of the CCs due to the varying SCSs configured for the CCs.

In some cases, the SLIV indicated by the single DCI, such as the DCI 415, may represent a number of symbols for data transmission, which may be the same across each of the CCs of the plurality of CCs. In such an example, the absolute transmission time for each CC may differ even though the number of symbols for each of the CCs is the same.

In some cases, when repetitions on different CCs are scheduled by a single DCI, the transport block size may be determined based on a nominal length for the transmission and a nominal RE, which may be indicated by the DCI 415. Additionally, in some cases, the transport block size may be determined based on nominal REs common across all CCs. In such cases, different repetitions are typically not self-decodable.

Figure 5:
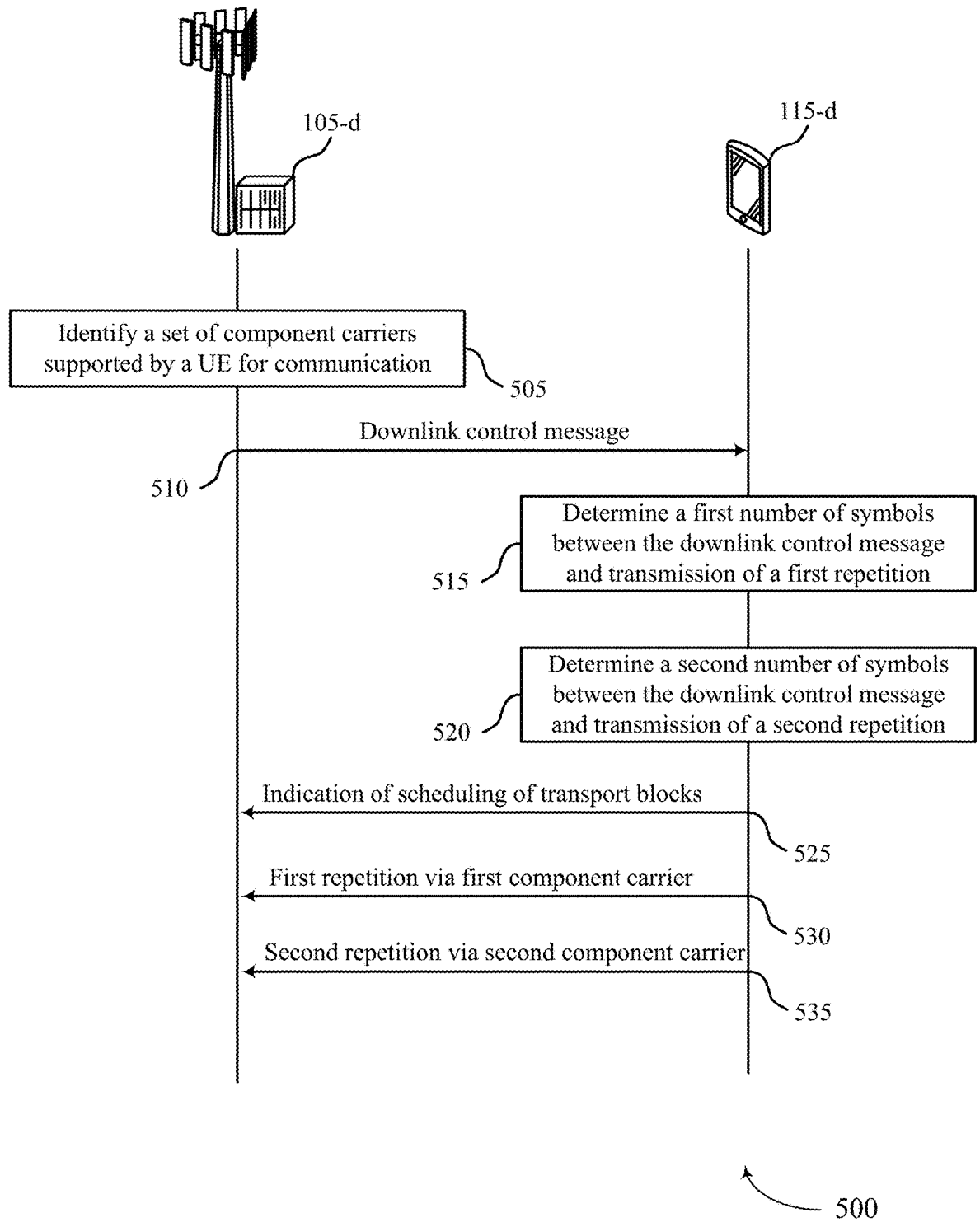
FIG. 5 illustrates an example of a process flow that supports cross carrier shared channel repetition in accordance with aspects of the present disclosure.

FIG. 5 illustrates an example of a process flow 500 that supports cross CC shared channel repetition in accordance with aspects of the present disclosure. In some examples, the process flow 500 may implement aspects of wireless communications systems 100, 200, 300, or 400. Process flow 500 may include UE 115-*d* and base station 105-*d*, which may be examples of UE 115 and base station 105 described with reference to FIGS. 1, 2, 3, and 4.

When transmitting DCI, the base station 105-*d* may communicate with the UE 115-*d* to facilitate cross CC shared channel repetition.

At 505, the base station 105-*d* may identify a set of CCs supported by the UE 115-*d* for communications with the base station 105-*d*. In some cases, the UE 115-*d* may identify the set of CCs that are supported by the UE 115-*d* for communications with the base station 105-*d*. In some cases, the set of CCs supported by the UE 115-*d* may include a first CC and a second CC. In some cases, a plurality of CCs may be supported by the UE 115-*d* for communications with the base station 105-*d*.

At 510, the UE 115-*d* may receive a downlink control message from the base station 105-*d*. In some cases, the downlink control message may schedule multiple repetitions of a transport block for the UE 115-*d*. In some cases, a first repetition of the multiple repetitions may be scheduled on a first CC of the set of CCs. In some cases, a second repetition of the multiple repetitions is scheduled on a second CC of the set of CCs.

In some cases, one of the UE 115-*d* or the base station 105-*d* may receive, via RRC signaling, a reference SCS configuration for each of a subset of the set of CCs. In such cases, the one of the UE 115-*d* or the base station 105-*d* may determine a number of symbols between the downlink control message and transmission of the first repetition via the first CC based at least in part on the reference SCS configuration. In some cases, the one of the UE 115-*d* or the base station 105-*d* may determine the number of symbols between the downlink control message and reception of the first repetition. In some such cases, the number of symbols is based at least in part on a minimum or a maximum slot format indicator of the subset, an indication within the downlink control message, a SCS of the first CC, or a SCS associated with the downlink control message.

At 515, the UE 115-*d* may determine a first number of symbols between the downlink control message and transmission of a first repetition. In some cases, the UE 115-*d* may determine a first number of symbols between the downlink control message and reception of the first repetition. In some cases, the UE 115-*d* may determine the first number of symbols between the downlink control message and either of the transmission or the reception of the first repetition via the first CC based at least in part on a SCS of the first CC.

At 520, the UE 115-*d* may determine a second number of symbols between the downlink control message and transmission of a second repetition. In some cases, the UE 115-*d* may determine a second number of symbols between the downlink control message and reception of the second repetition. In some cases, the UE 115-*d* may determine the second number of symbols between the downlink control message and either of the transmission or the reception of the second repetition via the first CC based at least in part on a SCS of the second CC.

In some cases, one of the UE 115-*d* or the base station 105-*d* may determine a first slot for transmission or reception of the first repetition via the first CC based at least in part on a SCS of the first CC. In such cases, the one of the UE 115-*d* or the base station 105-*d* may determine a second slot for transmission or reception of the second repetition via the second CC based at least in part on a SCS of the second CC.

In some examples, one of the UE 115-*d* or the base station 105-*d* may receive, via RRC signaling, a reference SCS configuration for each of a subset of the set of CCs. In such examples, the one of the UE 115-*d* or the base station 105-*d* may determine a starting symbol and length in time for transmission or reception of the first repetition via the first CC based at least in part on the reference SCS configuration. In these such examples, the starting symbol and length in time may be the same for the first CC and the second CC.

In some cases, one of the base station 105-*d* or the UE 115-*d* may determine a number of symbols for transmission or reception of the first repetition via the first CC. In such examples, the number of symbols may be the same for the first CC and the second CC. In some examples, one of the base station 105-*d* or the UE 115-*d* may determine a transport block size for transmission or reception of the first repetition via the first CC based at least in part on a nominal length in time and a nominal set of resource elements indicated by the downlink control message. In such examples, the transport block size may be the same for the first CC and the second CC.

In some cases, one of the base station 105-*d* or the UE 115-*d* may determine a transport block size for transmission or reception of the first repetition via the first CC based at least in part on a nominal set of resource elements for the first CC and the second CC.

At 525, the base station 105-*d* may receive an indication of scheduling the transport blocks. In some cases, the indication received by the base station 105-*d* may indicate that the multiple repetitions of the transport block are scheduled via the first and second CCs. In some cases, the multiple repetitions of the transport block may be scheduled via the first and second CCs according to one or both of a FDM scheme or a TDM scheme. In some cases, the indication may be received via RRC signaling, a MAC-CE, or DCI.

In some examples, one of the base station 105-*d* or the UE 115-*d* may receive an indication of a subset of the set of CCs available for the multiple repetitions of the transport block. In some cases, the subset may include at least the first CC and the second CC. In some case, the indication of the subset may be received by the base station 105-*d* via RRC signaling, a MAC-CE, or DCI. In some cases, the indication of the subset includes a set of carrier indices that corresponds to the subset of the set of CCs.

In some cases, one of the base station 105-*d* or the UE 115-*d* may receive an indication of at least one CC of the set of CCs to be dropped for the multiple repetitions of the transport block. In some cases, one of the base station 105-*d* or the UE 115-*d* may receive an indication of a starting CC for the multiple repetitions of the transport block. In some examples, one of the UE 115-*d* or the base station 105-*d* may transmit feedback for a subset of the CCs and one of the UE 115-*d* or the base station 105-*d* may receive an indication of a starting CC for the multiple repetitions of the transport block based at least in part on the feedback. In such an example, the subset may include the starting CC and the feedback may indicate ACK/NACK feedback or a SINR for each CC of the subset.

In some cases, one of the base station 105-*d* or the UE 115-*d* may receive, via RRC signaling, a reference SCS configuration for each of a subset of the set of CCs. In such cases, in the one of the base station 105-*d* or the UE 115-*d* may determine a slot for transmission or reception of the first repetition via the first CC based at least in part on the reference SCS configuration.

At 530, the UE 115-*d* may transmit the first repetition via the first CC, and at 535, the UE 115-*d* may transmit the second repetition via the second CC.

Figure 6:
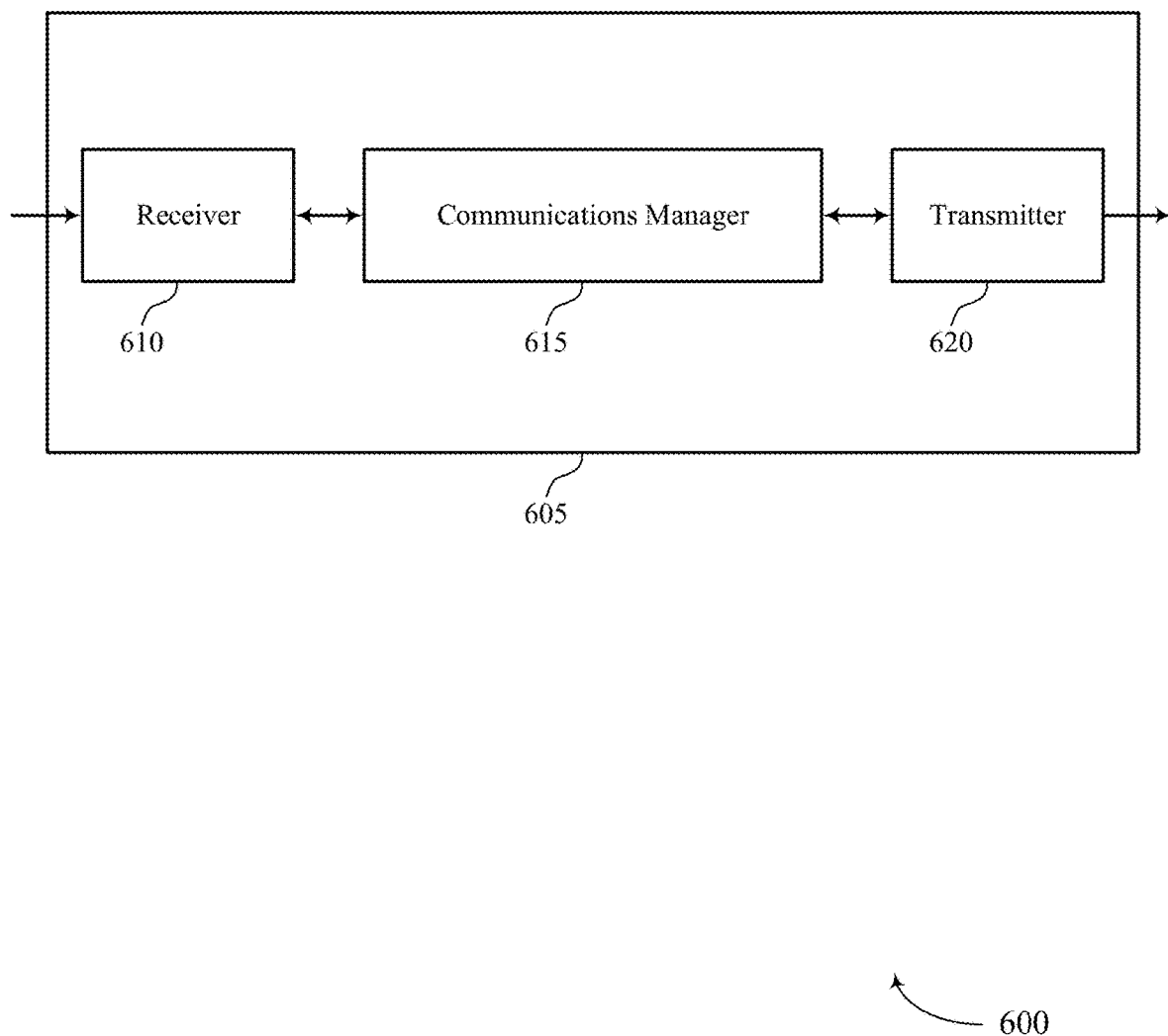
FIGS. 6 and 7 show block diagrams of devices that support cross carrier shared channel repetition in accordance with aspects of the present disclosure.

FIG. 6 shows a block diagram 600 of a device 605 that supports cross carrier shared channel repetition in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to cross carrier shared channel repetition, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a set of CCs supported by the UE for communications with a base station, receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may provide for reduced signaling overhead when scheduling communications across multiple CCs. For example, the device 605 may receive DCI that schedules uplink or downlink communications on multiple CCs. By scheduling communications for multiple CCs using a single DCI, signaling overhead and signal monitoring by the device 604 may be reduced Utilizing such techniques, a processor of a UE 115 (e.g., a processor controlling the receiver 610, the communications manager 615, the transmitter 620, etc.) may reduce processing resources used for communications. For example, when a single DCI scheduling across multiple CCs is received, the processor may refrain from monitoring one or more CCs for additional control messages corresponding to those CCs. As such, the device 605 may reduce power consumption and increase battery life.

Figure 7:
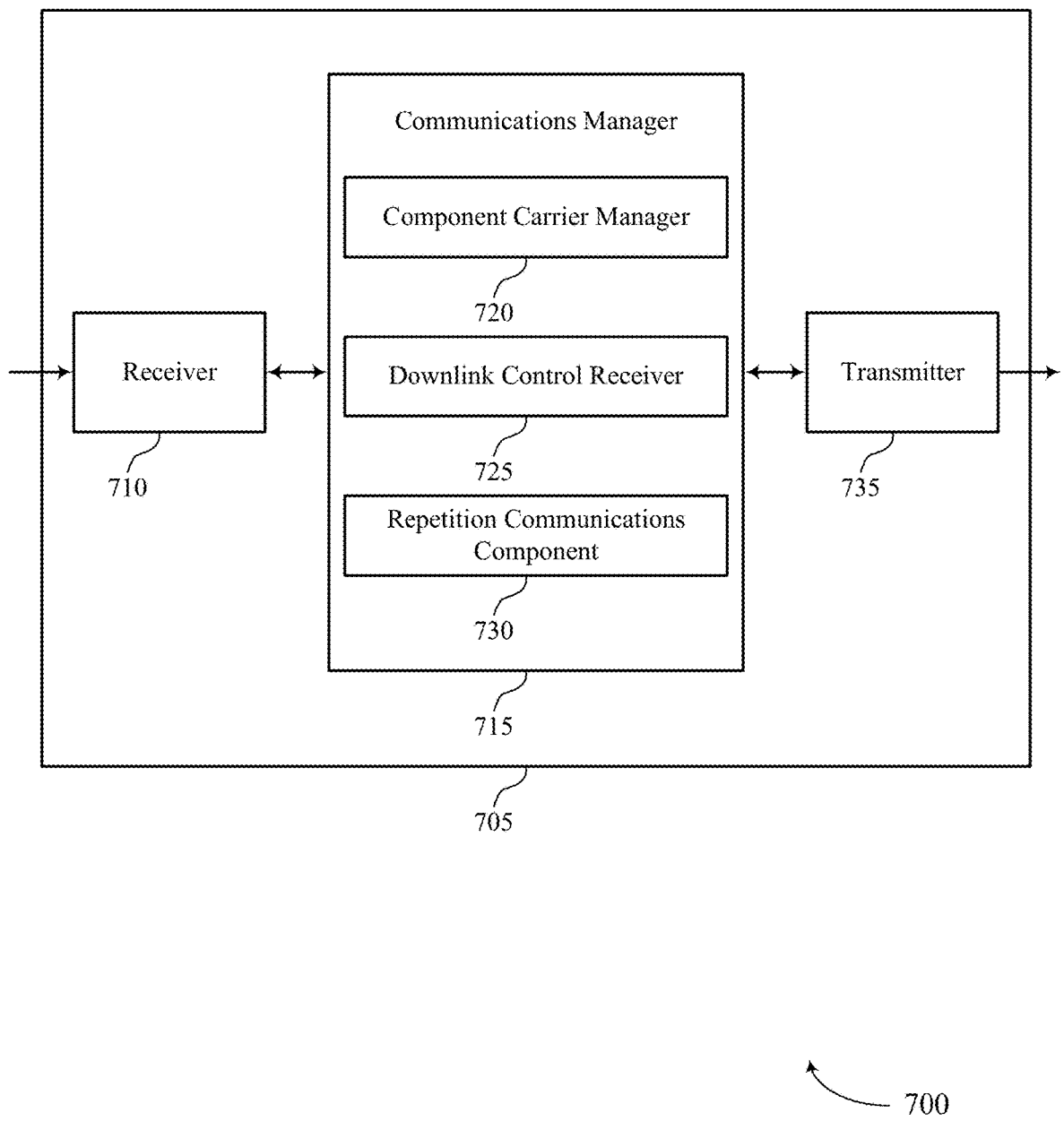

FIG. 7 shows a block diagram 700 of a device 705 that supports cross carrier shared channel repetition in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to cross carrier shared channel repetition, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CC manager 720, a downlink control receiver 725, and a repetition communications component 730. The communications manager 715 may be an example of aspects of the communications manager 910 described herein.

The CC manager 720 may identify a set of CCs supported by the UE for communications with a base station.

The downlink control receiver 725 may receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs.

The repetition communications component 730 may transmit or receiving the first repetition via the first CC and the second repetition via the second CC.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
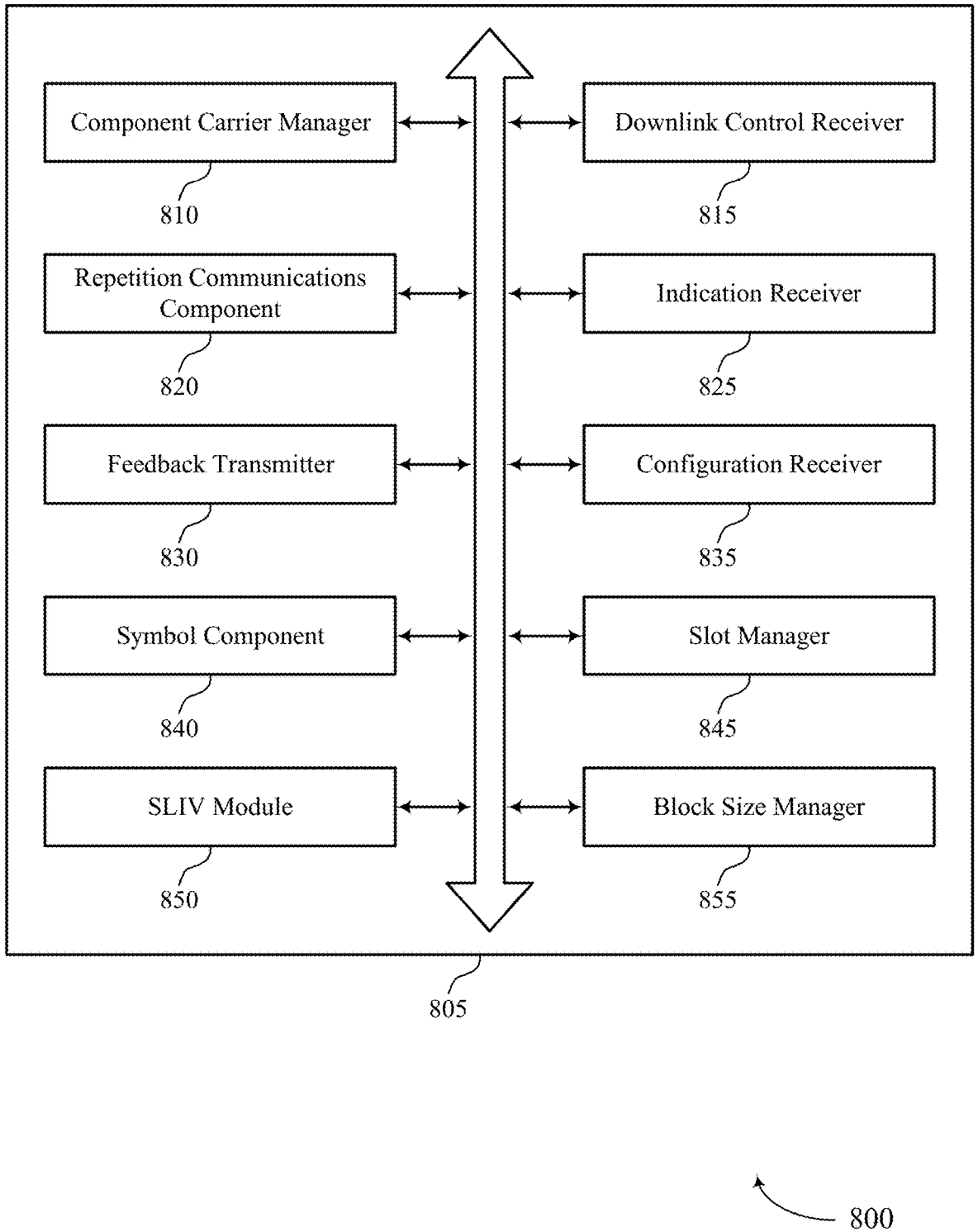
FIG. 8 shows a block diagram of a communications manager that supports cross carrier shared channel repetition in accordance with aspects of the present disclosure.

FIG. 8 shows a block diagram 800 of a communications manager 805 that supports cross carrier shared channel repetition in accordance with aspects of the present disclosure. The communications manager 805 may be an example of aspects of a communications manager 615, a communications manager 715, or a communications manager 910 described herein. The communications manager 805 may include a CC manager 810, a downlink control receiver 815, a repetition communications component 820, an indication receiver 825, a feedback transmitter 830, a configuration receiver 835, a symbol component 840, a slot manager 845, a SLIV module 850, and a block size manager 855. Each of these modules may communicate, directly or indirectly, with one another (e.g., via one or more buses).

The CC manager 810 may identify a set of CCs supported by the UE for communications with a base station.

The downlink control receiver 815 may receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs.

The repetition communications component 820 may transmit or receiving the first repetition via the first CC and the second repetition via the second CC.

The indication receiver 825 may receive an indication that the multiple repetitions of the transport block are scheduled via the first and second CCs according to one or both of a FDM scheme or a TDM scheme.

In some examples, the indication receiver 825 may receive an indication of a subset of the set of CCs available for the multiple repetitions of the transport block, the subset including at least the first CC and the second CC, where the indication is received via RRC signaling, a MAC-CE, or DCI.

In some examples, the indication receiver 825 may receive an indication of at least one CC of the set of CCs to be dropped for the multiple repetitions of the transport block.

In some examples, the indication receiver 825 may receive an indication of a starting CC for the multiple repetitions of the transport block.

In some examples, receiving an indication of a starting CC for the multiple repetitions of the transport block based on the feedback, where the subset includes the starting CC.

In some cases, the indication is received via RRC signaling, a MAC-CE, or DCI.

In some cases, the indication includes a set of carrier indices that corresponds to the subset of the set of CCs.

The feedback transmitter 830 may transmit feedback for a subset of the set of CCs.

In some cases, the feedback indicates ACK/(NACK feedback or a SINR for each CC of the subset.

The configuration receiver 835 may receive, via RRC signaling, a reference SCS configuration for each of a subset of the set of CCs.

The symbol component 840 may determine a number of symbols between the downlink control message and transmission or reception of the first repetition via the first CC based on the reference SCS configuration.

In some examples, the symbol component 840 may determine a first number of symbols between the downlink control message and transmission or reception of the first repetition via the first CC based on a SCS of the first CC.

In some examples, the symbol component 840 may determine a second of symbols between the downlink control message and transmission or reception of the second repetition via the second CC based on a SCS of the second CC.

In some examples, the symbol component 840 may determine a number of symbols for transmission or reception of the first repetition via the first CC, where the number of symbols is the same for the first CC and the second CC.

In some cases, the number of symbols is based on a minimum or a maximum slot format indicator of the subset, an indication within the downlink control message, a SCS of the first CC, or a SCS associated with the downlink control message.

The slot manager 845 may determine a slot for transmission or reception of the first repetition via the first CC based on the reference SCS configuration.

In some examples, the slot manager 845 may determine a first slot for transmission or reception of the first repetition via the first CC based on a SCS of the first CC.

In some examples, the slot manager 845 may determine a second slot for transmission or reception of the second repetition via the second CC based on a SCS of the second CC.

The SLIV module 850 may determine a starting symbol and length in time for transmission or reception of the first repetition via the first CC based on the reference SCS configuration, where the starting symbol and length in time is the same for the first CC and the second CC.

The block size manager 855 may determine a transport block size for transmission or reception of the first repetition via the first CC based on a nominal length in time and a nominal set of resource elements indicated by the downlink control message, where the transport block size is the same for the first CC and the second CC.

In some examples, the block size manager 855 may determine a transport block size for transmission or reception of the first repetition via the first CC based on a nominal set of resource elements for the first CC and the second CC.

Figure 9:
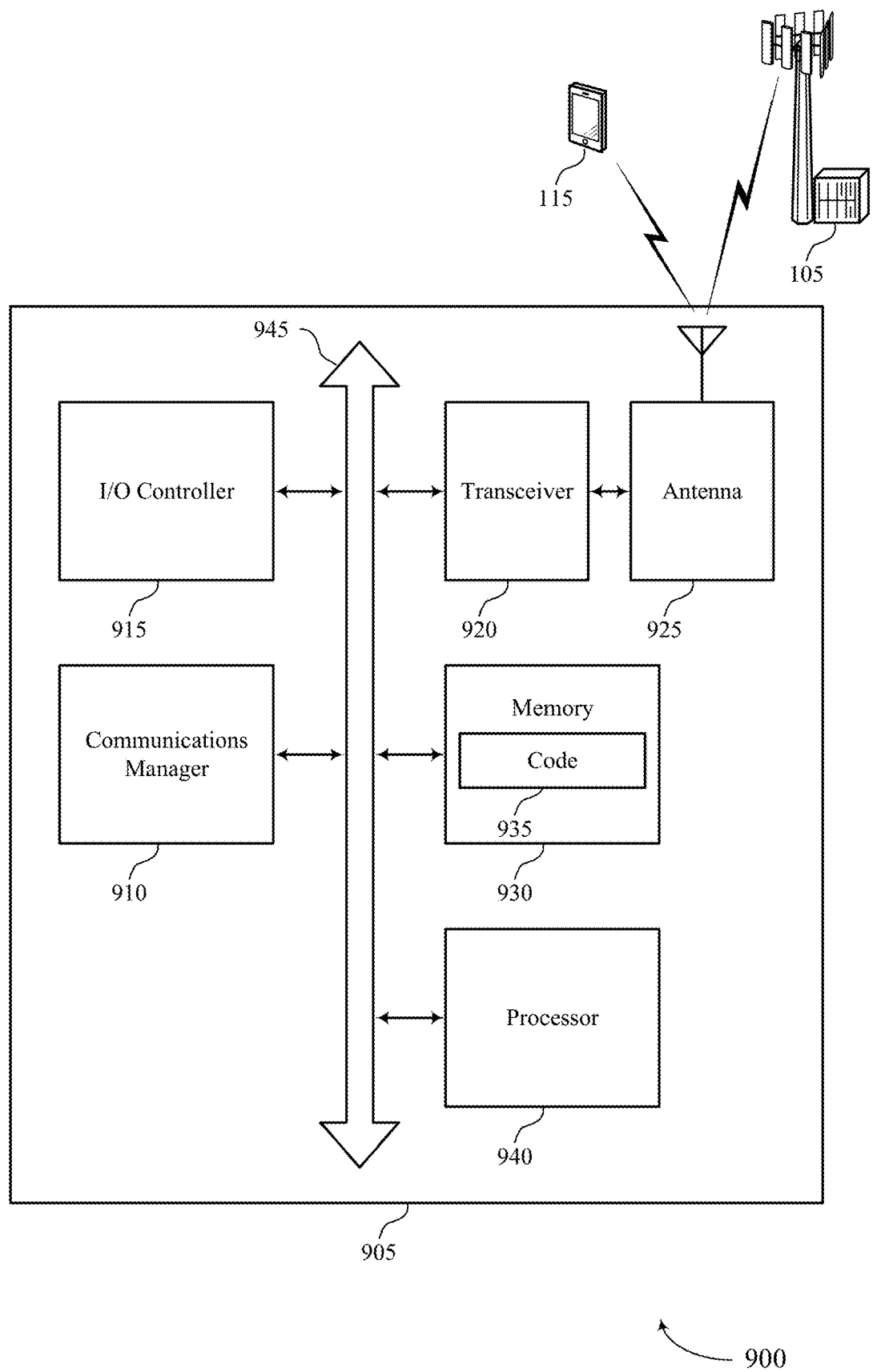
FIG. 9 shows a diagram of a system including a device that supports cross carrier shared channel repetition in accordance with aspects of the present disclosure.

FIG. 9 shows a diagram of a system 900 including a device 905 that supports cross carrier shared channel repetition in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a set of CCs supported by the UE for communications with a base station, receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting cross carrier shared channel repetition).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
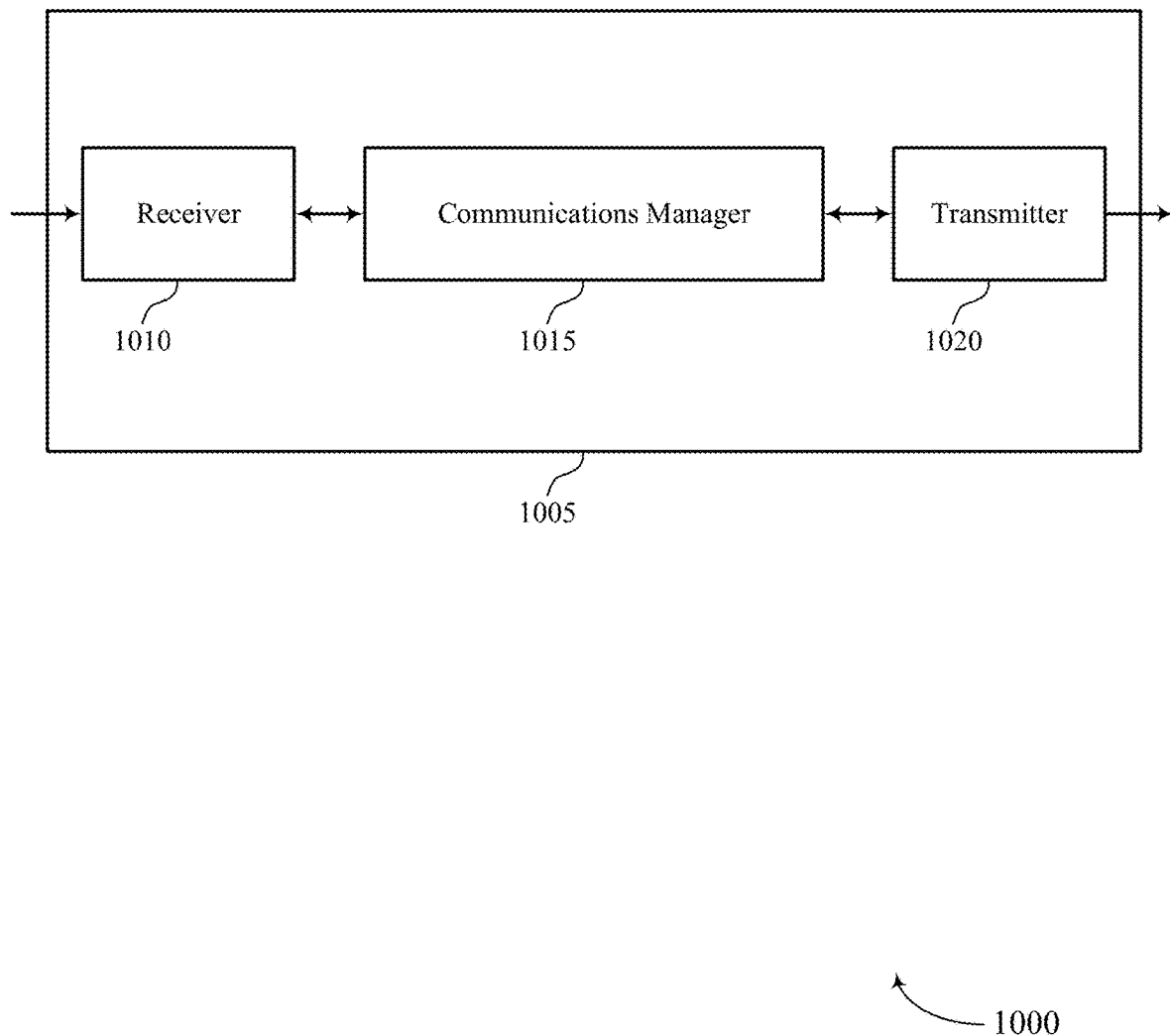
FIGS. 10 and 11 show block diagrams of devices that support cross carrier shared channel repetition in accordance with aspects of the present disclosure.

FIG. 10 shows a block diagram 1000 of a device 1005 that supports cross carrier shared channel repetition in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to cross carrier shared channel repetition, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of CCs supported by a UE for communications with the base station, transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
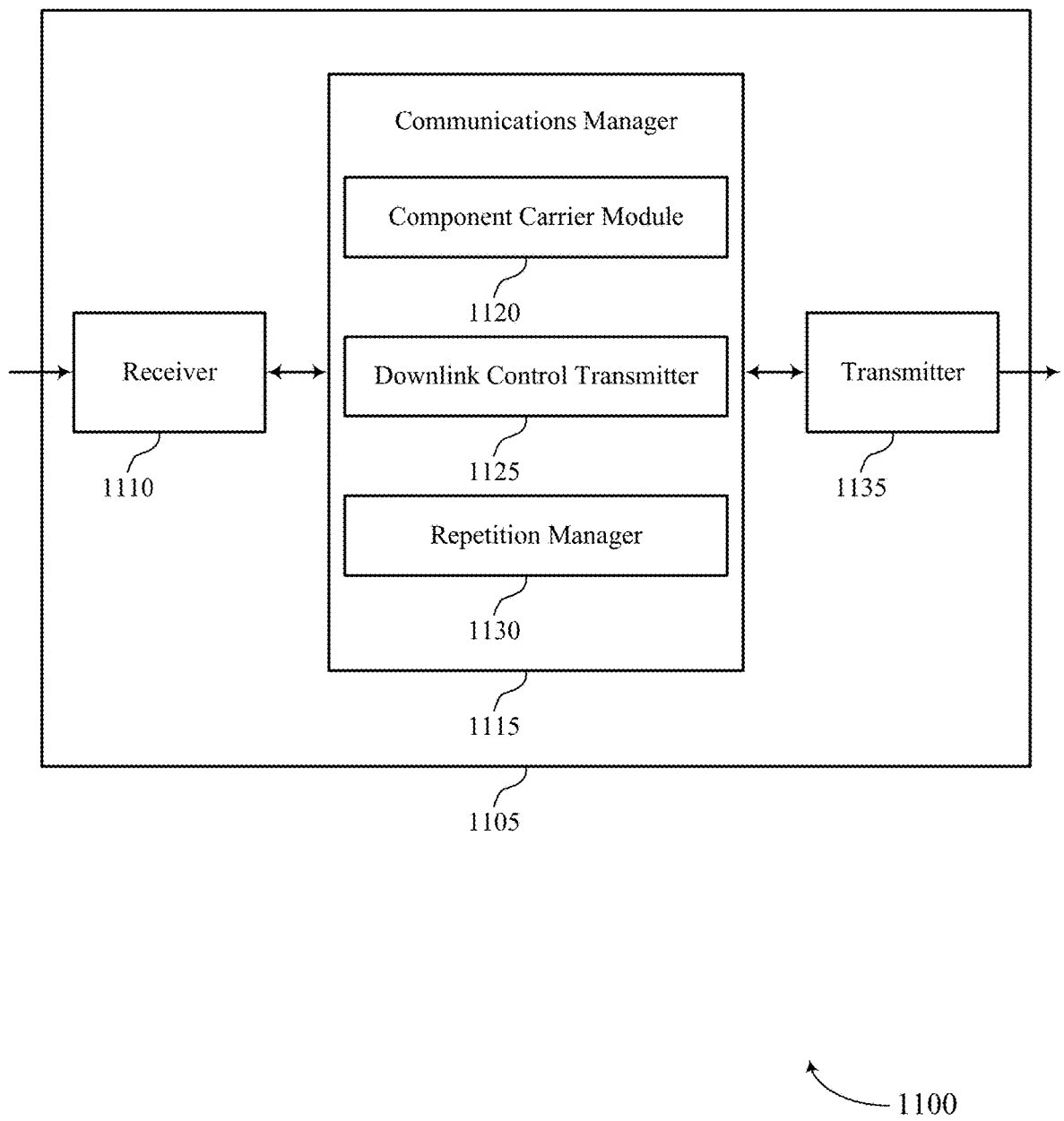

FIG. 11 shows a block diagram 1100 of a device 1105 that supports cross carrier shared channel repetition in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to cross carrier shared channel repetition, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CC module 1120, a downlink control transmitter 1125, and a repetition manager 1130. The communications manager 1115 may be an example of aspects of the communications manager 1310 described herein.

The CC module 1120 may identify a set of CCs supported by a UE for communications with the base station.

The downlink control transmitter 1125 may transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs.

The repetition manager 1130 may transmit or receiving the first repetition via the first CC and the second repetition via the second CC.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
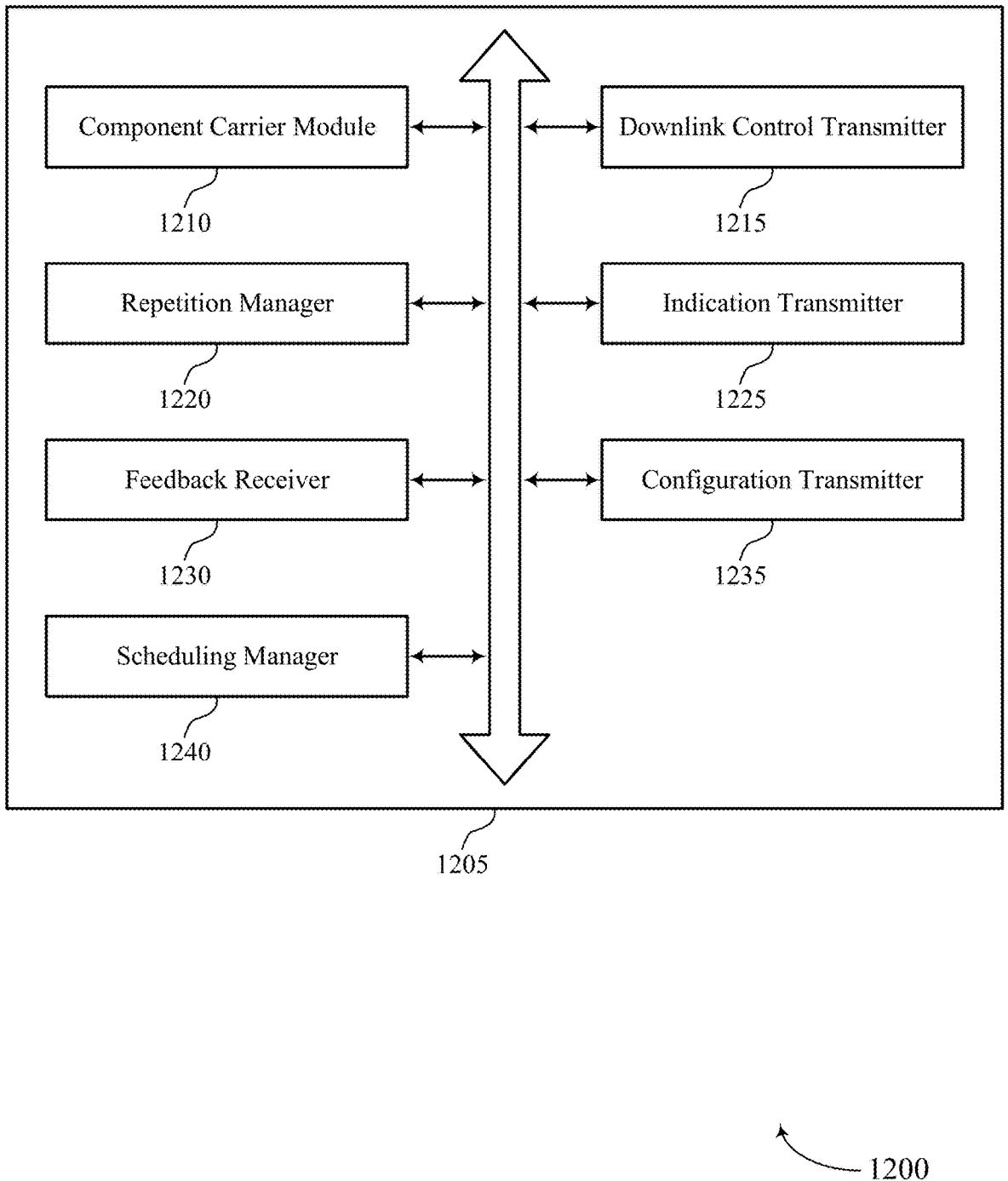
FIG. 12 shows a block diagram of a communications manager that supports cross carrier shared channel repetition in accordance with aspects of the present disclosure.

FIG. 12 shows a block diagram 1200 of a communications manager 1205 that supports cross carrier shared channel repetition in accordance with aspects of the present disclosure. The communications manager 1205 may be an example of aspects of a communications manager 1015, a communications manager 1115, or a communications manager 1310 described herein. The communications manager 1205 may include a CC module 1210, a downlink control transmitter 1215, a repetition manager 1220, an indication transmitter 1225, a feedback receiver 1230, a configuration transmitter 1235, and a scheduling manager 1240. Each of these modules may communicate, directly or indirectly, with one another (e.g., via one or more buses).

The CC module 1210 may identify a set of CCs supported by a UE for communications with the base station.

The downlink control transmitter 1215 may transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs.

The repetition manager 1220 may transmit or receiving the first repetition via the first CC and the second repetition via the second CC.

The indication transmitter 1225 may transmit an indication that the multiple repetitions of the transport block are scheduled via the first and second CCs according to one or both of a FDM scheme or a TDM scheme.

In some examples, the indication transmitter 1225 may transmit an indication of a subset of the set of CCs available for the multiple repetitions of the transport block, the subset including at least the first CC and the second CC, where the indication is transmitted via RRC signaling, a MAC-CE, or DCI.

In some examples, the indication transmitter 1225 may transmit an indication of at least one CC of the set of CCs to be dropped for the multiple repetitions of the transport block.

In some examples, the indication transmitter 1225 may transmit an indication of a starting CC for the multiple repetitions of the transport block.

In some examples, transmitting an indication of a starting CC for the multiple repetitions of the transport block based on the feedback, where the subset includes the starting CC.

In some cases, the indication is transmitted via RRC signaling, a MAC-CE, or DCI.

In some cases, the indication includes a set of carrier indices that corresponds to the subset of the set of CCs.

The feedback receiver 1230 may receive, from the UE, feedback for a subset of the set of CCs.

In some cases, the feedback indicates ACK/NACK feedback or a SINR for each CC of the subset.

The configuration transmitter 1235 may transmit, via RRC signaling, a reference SCS configuration for each of a subset of the set of CCs.

The scheduling manager 1240 may schedule transmission or reception of the first repetition via the first CC based on the reference SCS configuration.

In some examples, the scheduling manager 1240 may schedule transmission or reception of the second repetition via the second CC based on the reference SCS configuration.

In some examples, the scheduling manager 1240 may schedule transmission or reception of the first repetition via the first CC based on a first SCS configuration associated with the first CC.

In some examples, the scheduling manager 1240 may schedule transmission or reception of the second repetition via the second CC based on a second SCS configuration associated with the second CC.

In some examples, the scheduling manager 1240 may schedule transmission or reception of the first repetition via the first CC based on a SCS configuration associated with the downlink control message.

Figure 13:
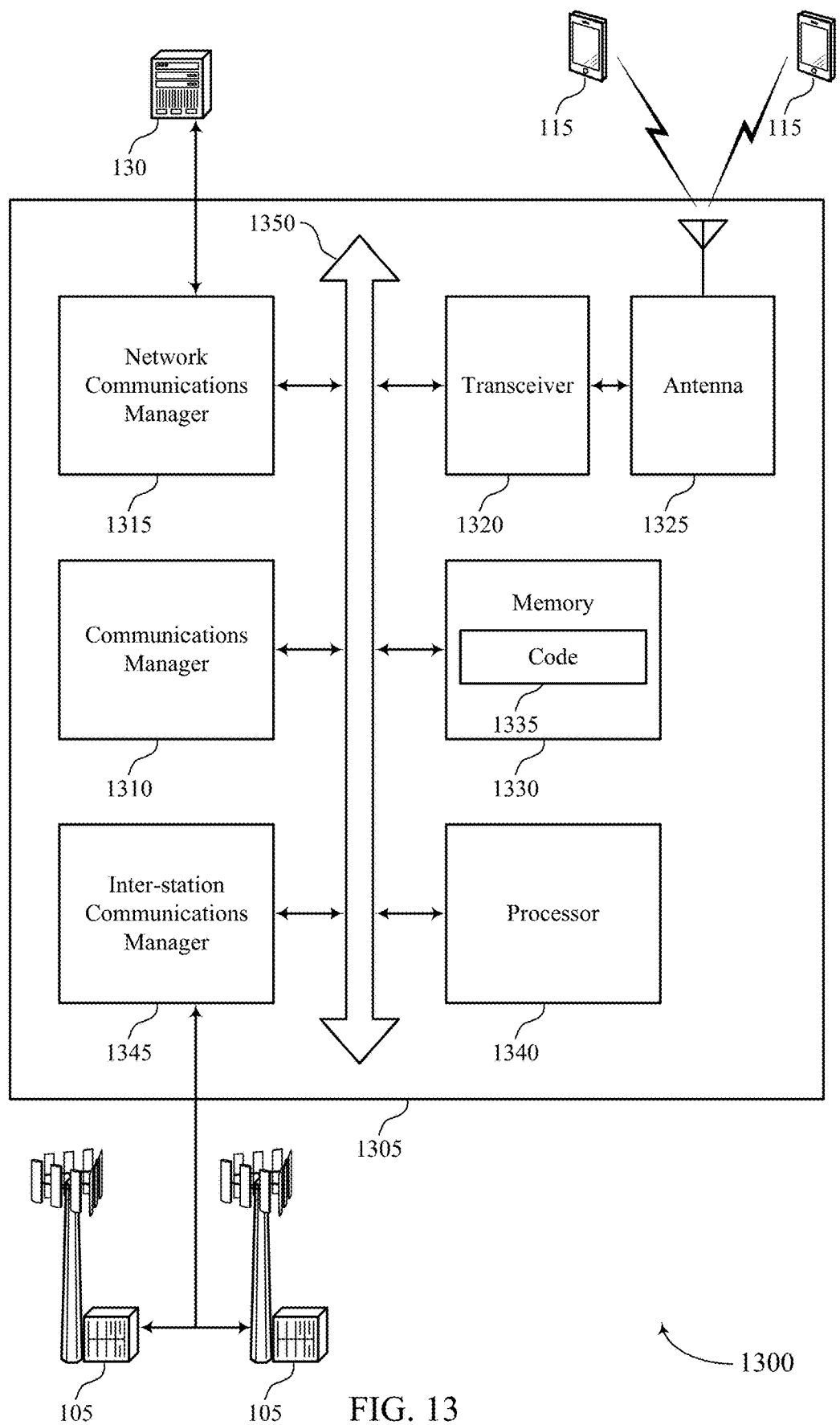
FIG. 13 shows a diagram of a system including a device that supports cross carrier shared channel repetition in accordance with aspects of the present disclosure.

FIG. 13 shows a diagram of a system 1300 including a device 1305 that supports cross carrier shared channel repetition in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of CCs supported by a UE for communications with the base station, transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs, and transmit or receiving the first repetition via the first CC and the second repetition via the second CC.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting cross carrier shared channel repetition).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
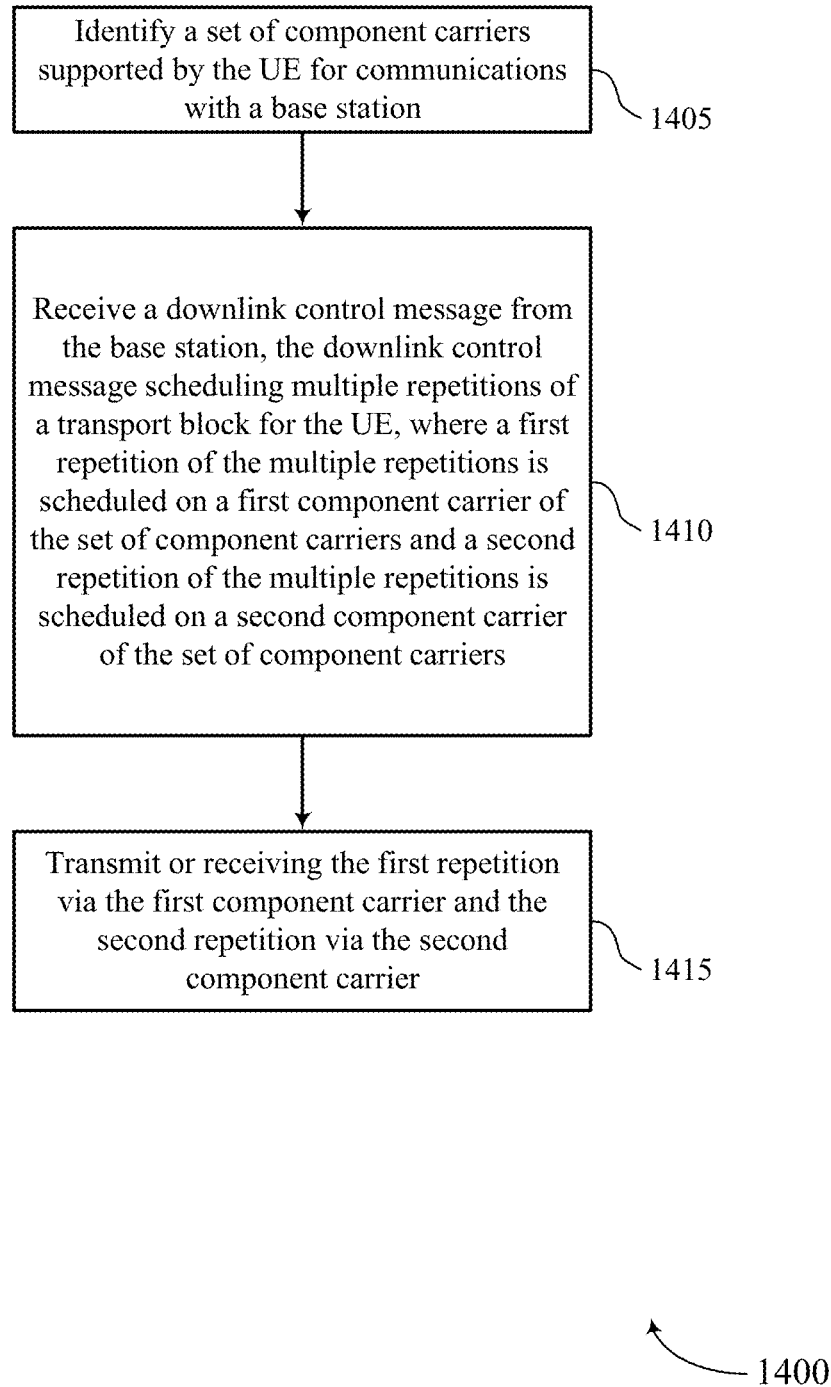
FIGS. 14 through 20 show flowcharts illustrating methods that support cross carrier shared channel repetition in accordance with aspects of the present disclosure.

FIG. 14 shows a flowchart illustrating a method 1400 that supports cross carrier shared channel repetition in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a set of CCs supported by the UE for communications with a base station. The operations of 1405 may be performed according to the methods described herein. In some examples, aspects of the operations of 1405 may be performed by a CC manager as described with reference to FIGS. 6 through 9.

At 1410, the UE may receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs. The operations of 1410 may be performed according to the methods described herein. In some examples, aspects of the operations of 1410 may be performed by a downlink control receiver as described with reference to FIGS. 6 through 9.

At 1415, the UE may transmit or receiving the first repetition via the first CC and the second repetition via the second CC. The operations of 1415 may be performed according to the methods described herein. In some examples, aspects of the operations of 1415 may be performed by a repetition communications component as described with reference to FIGS. 6 through 9.

Figure 15:
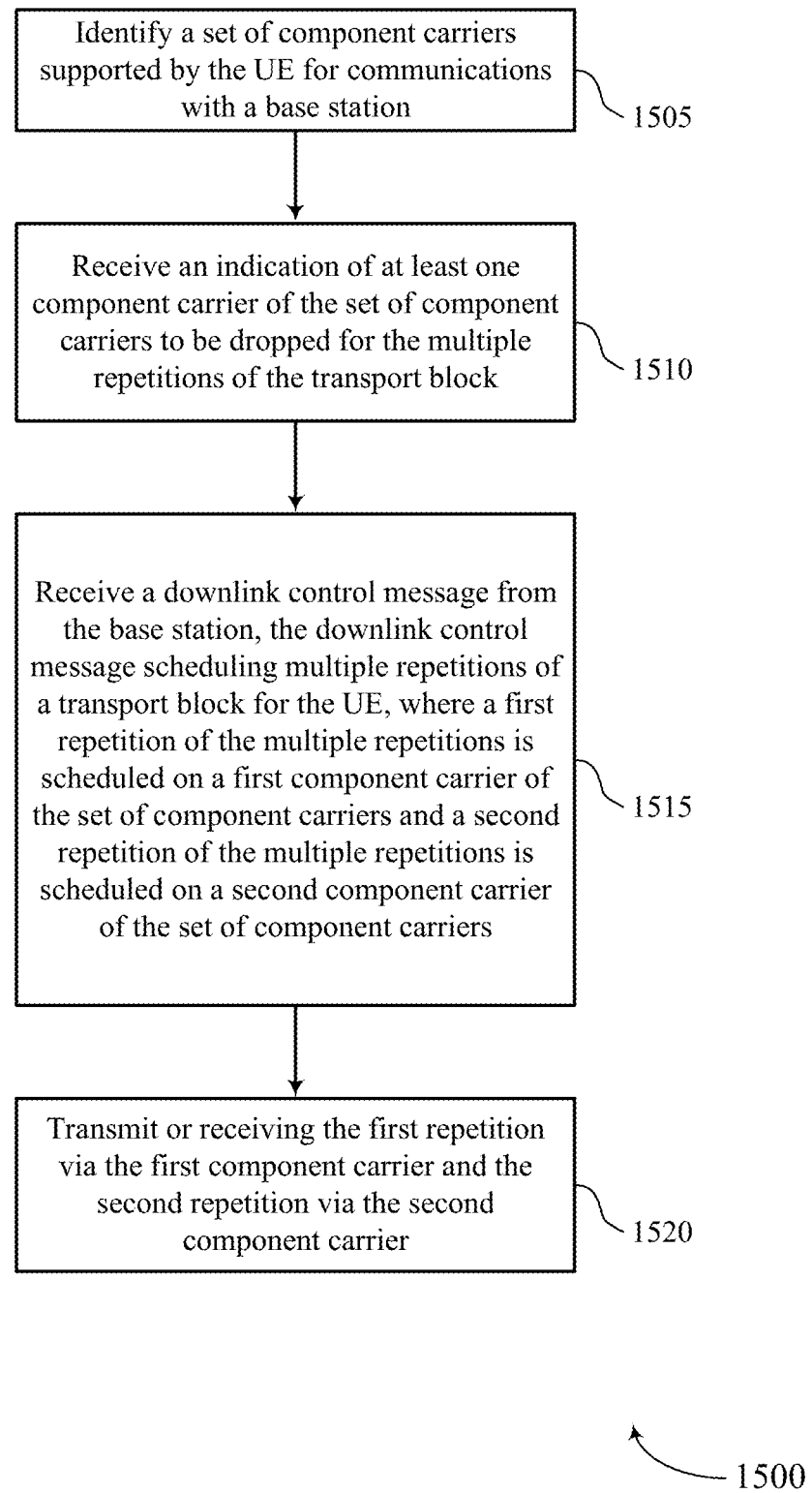

FIG. 15 shows a flowchart illustrating a method 1500 that supports cross carrier shared channel repetition in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a set of CCs supported by the UE for communications with a base station. The operations of 1505 may be performed according to the methods described herein. In some examples, aspects of the operations of 1505 may be performed by a CC manager as described with reference to FIGS. 6 through 9.

At 1510, the UE may receive an indication of at least one CC of the set of CCs to be dropped for the multiple repetitions of the transport block. The operations of 1510 may be performed according to the methods described herein. In some examples, aspects of the operations of 1510 may be performed by an indication receiver as described with reference to FIGS. 6 through 9.

At 1515, the UE may receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs. The operations of 1515 may be performed according to the methods described herein. In some examples, aspects of the operations of 1515 may be performed by a downlink control receiver as described with reference to FIGS. 6 through 9.

At 1520, the UE may transmit or receiving the first repetition via the first CC and the second repetition via the second CC. The operations of 1520 may be performed according to the methods described herein. In some examples, aspects of the operations of 1520 may be performed by a repetition communications component as described with reference to FIGS. 6 through 9.

Figure 16:
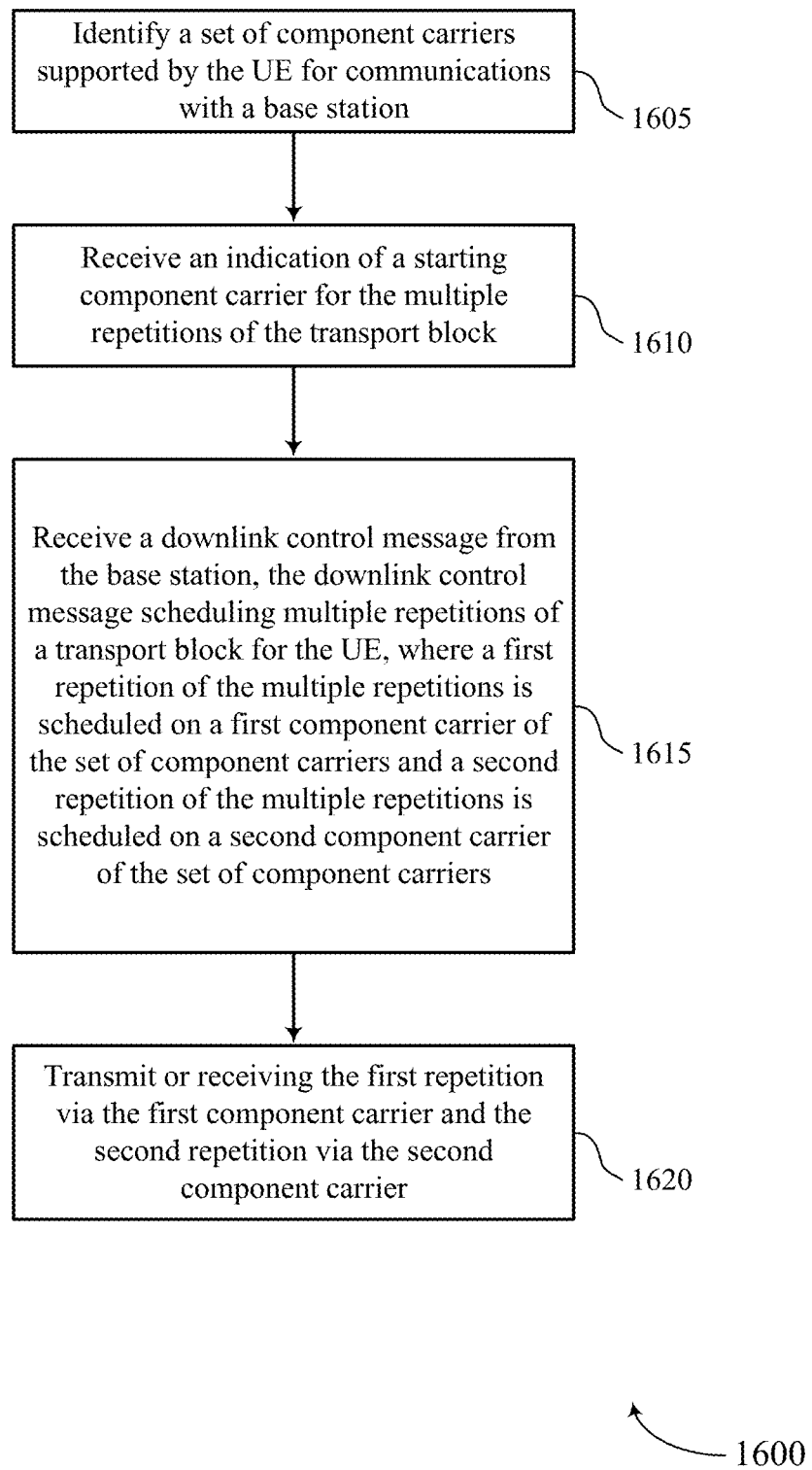

FIG. 16 shows a flowchart illustrating a method 1600 that supports cross carrier shared channel repetition in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a set of CCs supported by the UE for communications with a base station. The operations of 1605 may be performed according to the methods described herein. In some examples, aspects of the operations of 1605 may be performed by a CC manager as described with reference to FIGS. 6 through 9.

At 1610, the UE may receive an indication of a starting CC for the multiple repetitions of the transport block. The operations of 1610 may be performed according to the methods described herein. In some examples, aspects of the operations of 1610 may be performed by an indication receiver as described with reference to FIGS. 6 through 9.

At 1615, the UE may receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs. The operations of 1615 may be performed according to the methods described herein. In some examples, aspects of the operations of 1615 may be performed by a downlink control receiver as described with reference to FIGS. 6 through 9.

At 1620, the UE may transmit or receiving the first repetition via the first CC and the second repetition via the second CC. The operations of 1620 may be performed according to the methods described herein. In some examples, aspects of the operations of 1620 may be performed by a repetition communications component as described with reference to FIGS. 6 through 9.

Figure 17:
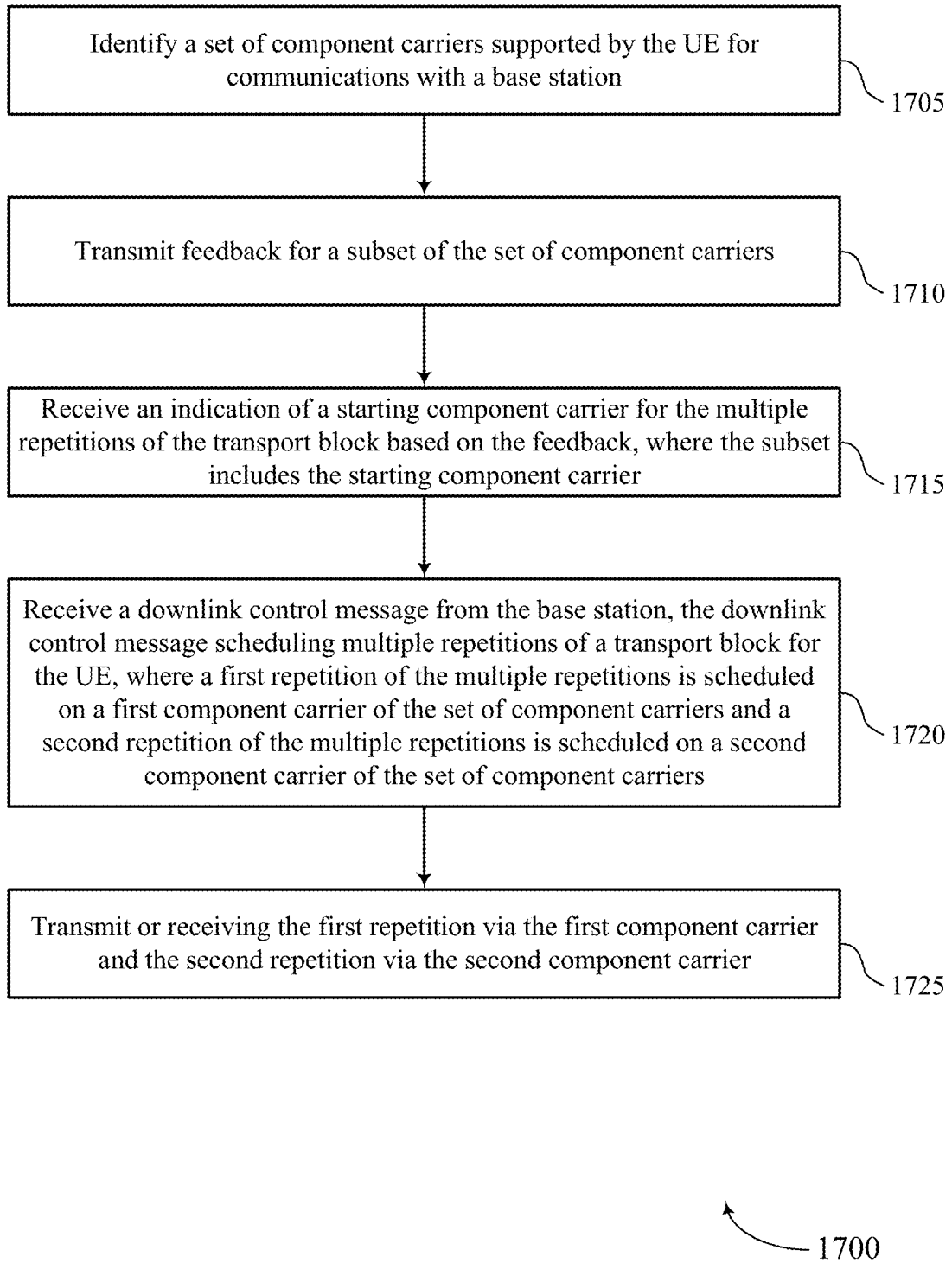

FIG. 17 shows a flowchart illustrating a method 1700 that supports cross carrier shared channel repetition in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may identify a set of CCs supported by the UE for communications with a base station. The operations of 1705 may be performed according to the methods described herein. In some examples, aspects of the operations of 1705 may be performed by a CC manager as described with reference to FIGS. 6 through 9.

At 1710, the UE may transmit feedback for a subset of the set of CCs. The operations of 1710 may be performed according to the methods described herein. In some examples, aspects of the operations of 1710 may be performed by a feedback transmitter as described with reference to FIGS. 6 through 9.

At 1715, the UE may receive an indication of a starting CC for the multiple repetitions of the transport block based on the feedback, where the subset includes the starting CC. The operations of 1715 may be performed according to the methods described herein. In some examples, aspects of the operations of 1715 may be performed by an indication receiver as described with reference to FIGS. 6 through 9.

At 1720, the UE may receive a downlink control message from the base station, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs. The operations of 1720 may be performed according to the methods described herein. In some examples, aspects of the operations of 1720 may be performed by a downlink control receiver as described with reference to FIGS. 6 through 9.

At 1725, the UE may transmit or receiving the first repetition via the first CC and the second repetition via the second CC. The operations of 1725 may be performed according to the methods described herein. In some examples, aspects of the operations of 1725 may be performed by a repetition communications component as described with reference to FIGS. 6 through 9.

Figure 18:
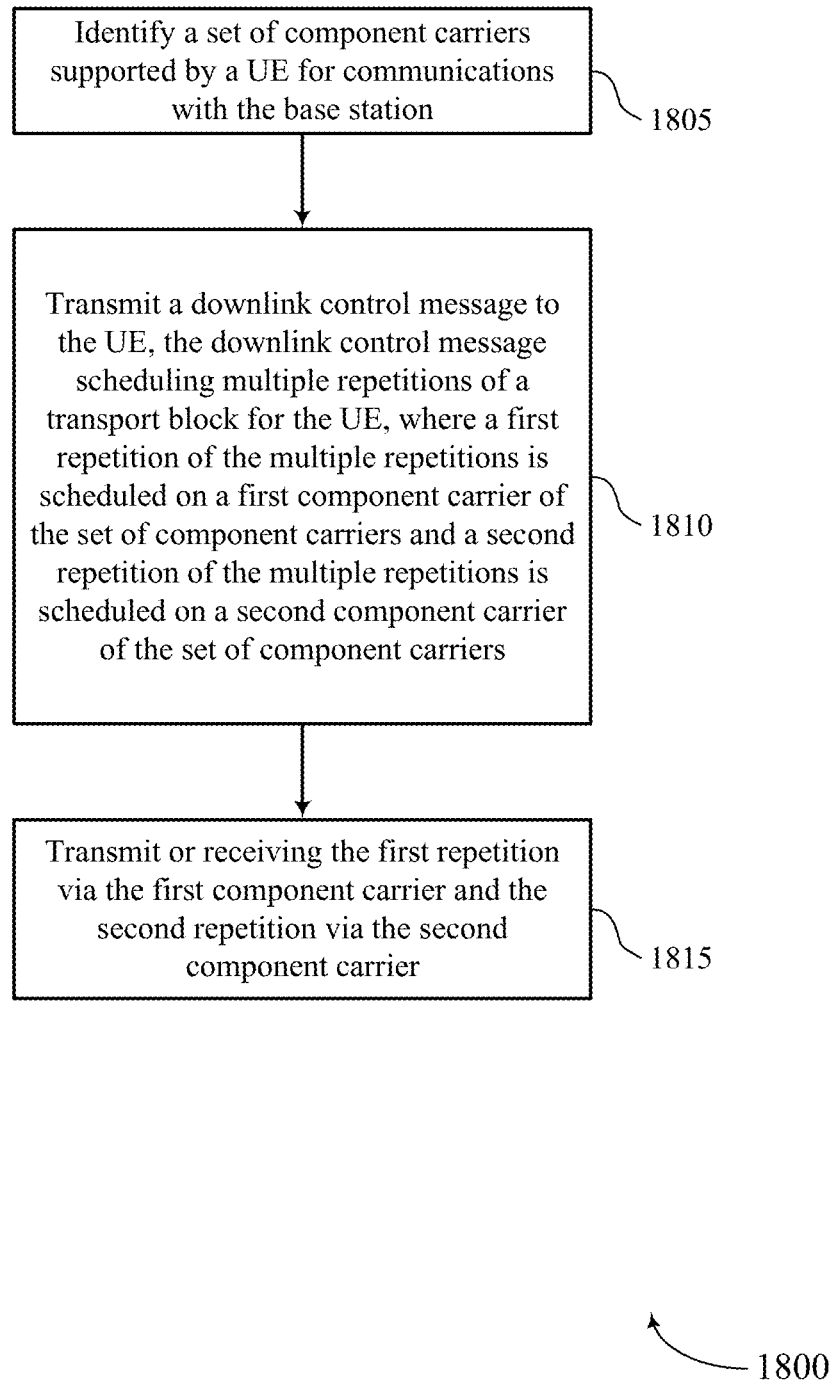

FIG. 18 shows a flowchart illustrating a method 1800 that supports cross carrier shared channel repetition in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify a set of CCs supported by a UE for communications with the base station.

The operations of 1805 may be performed according to the methods described herein. In some examples, aspects of the operations of 1805 may be performed by a CC module as described with reference to FIGS. 10 through 13.

At 1810, the base station may transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs. The operations of 1810 may be performed according to the methods described herein. In some examples, aspects of the operations of 1810 may be performed by a downlink control transmitter as described with reference to FIGS. 10 through 13.

At 1815, the base station may transmit or receiving the first repetition via the first CC and the second repetition via the second CC. The operations of 1815 may be performed according to the methods described herein. In some examples, aspects of the operations of 1815 may be performed by a repetition manager as described with reference to FIGS. 10 through 13.

Figure 19:
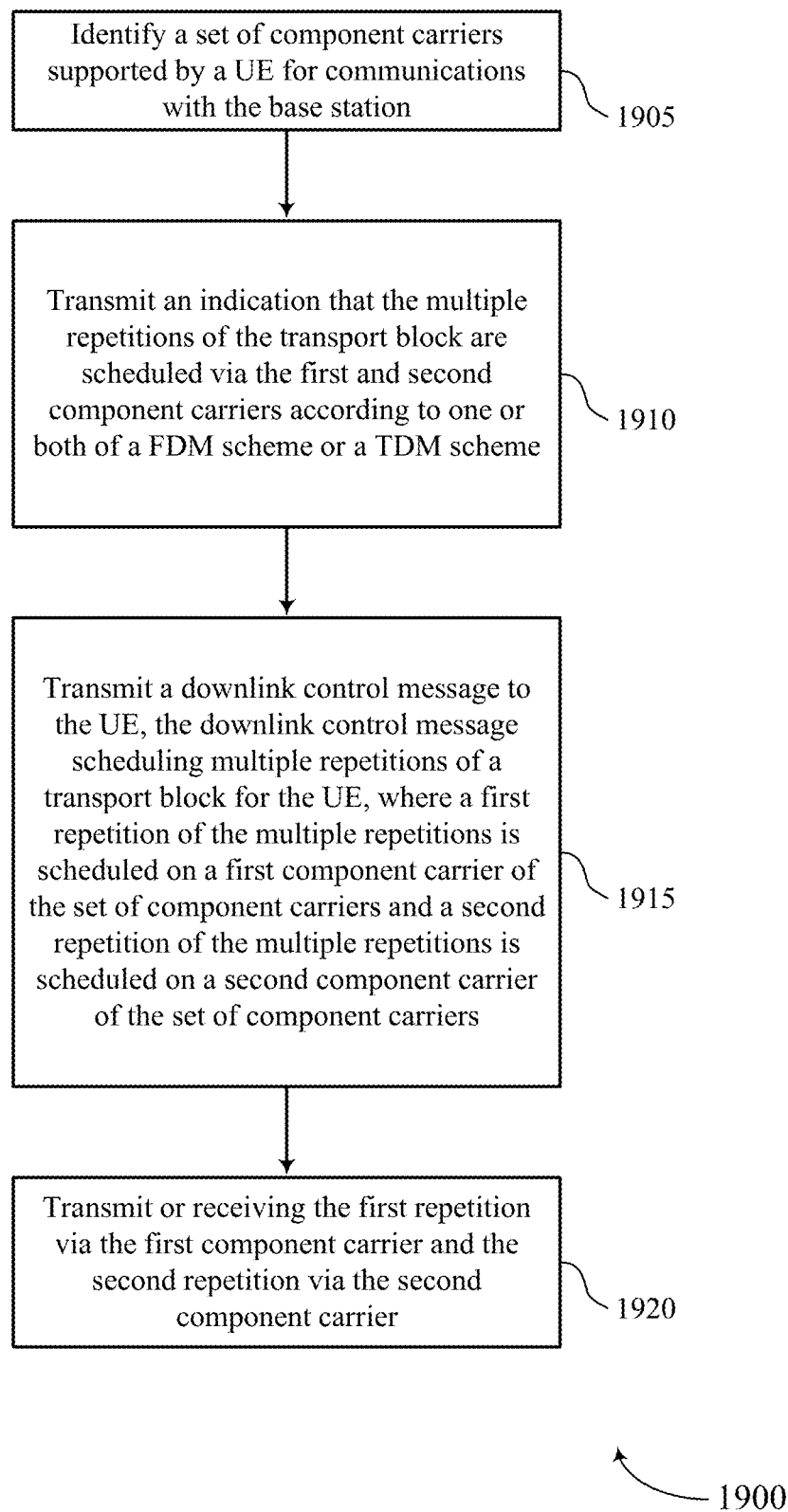

FIG. 19 shows a flowchart illustrating a method 1900 that supports cross carrier shared channel repetition in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may identify a set of CCs supported by a UE for communications with the base station. The operations of 1905 may be performed according to the methods described herein. In some examples, aspects of the operations of 1905 may be performed by a CC module as described with reference to FIGS. 10 through 13.

At 1910, the base station may transmit an indication that the multiple repetitions of the transport block are scheduled via the first and second CCs according to one or both of a FDM scheme or a TDM scheme. The operations of 1910 may be performed according to the methods described herein. In some examples, aspects of the operations of 1910 may be performed by an indication transmitter as described with reference to FIGS. 10 through 13.

At 1915, the base station may transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs. The operations of 1915 may be performed according to the methods described herein. In some examples, aspects of the operations of 1915 may be performed by a downlink control transmitter as described with reference to FIGS. 10 through 13.

At 1920, the base station may transmit or receiving the first repetition via the first CC and the second repetition via the second CC. The operations of 1920 may be performed according to the methods described herein. In some examples, aspects of the operations of 1920 may be performed by a repetition manager as described with reference to FIGS. 10 through 13.

Figure 20:
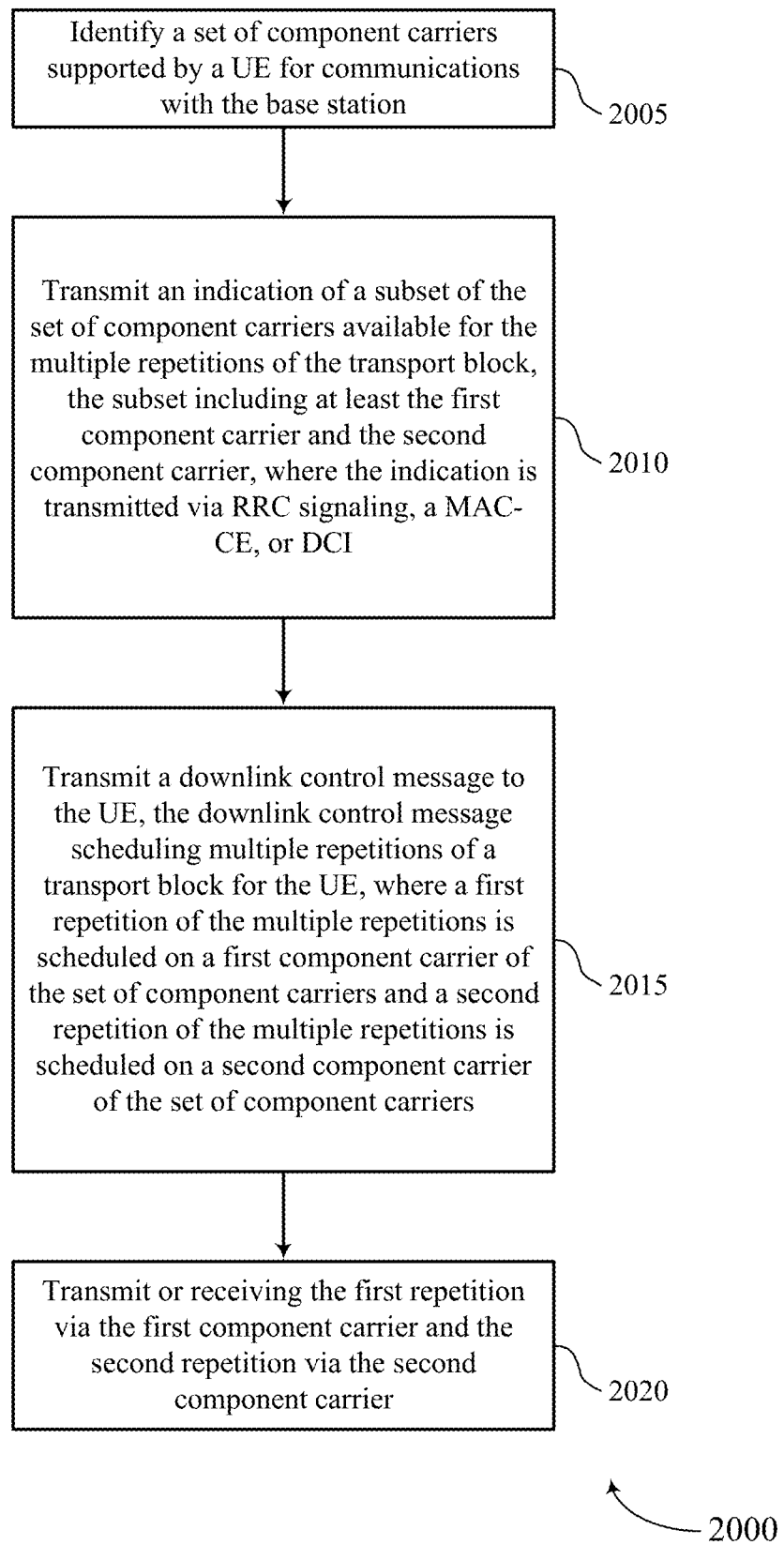

FIG. 20 shows a flowchart illustrating a method 2000 that supports cross carrier shared channel repetition in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may identify a set of CCs supported by a UE for communications with the base station. The operations of 2005 may be performed according to the methods described herein. In some examples, aspects of the operations of 2005 may be performed by a CC module as described with reference to FIGS. 10 through 13.

At 2010, the base station may transmit an indication of a subset of the set of CCs available for the multiple repetitions of the transport block, the subset including at least the first CC and the second CC, where the indication is transmitted via RRC signaling, a MAC-CE, or DCI. The operations of 2010 may be performed according to the methods described herein. In some examples, aspects of the operations of 2010 may be performed by an indication transmitter as described with reference to FIGS. 10 through 13.

At 2015, the base station may transmit a downlink control message to the UE, the downlink control message scheduling multiple repetitions of a transport block for the UE, where a first repetition of the multiple repetitions is scheduled on a first CC of the set of CCs and a second repetition of the multiple repetitions is scheduled on a second CC of the set of CCs. The operations of 2015 may be performed according to the methods described herein. In some examples, aspects of the operations of 2015 may be performed by a downlink control transmitter as described with reference to FIGS. 10 through 13.

At 2020, the base station may transmit or receiving the first repetition via the first CC and the second repetition via the second CC. The operations of 2020 may be performed according to the methods described herein. In some examples, aspects of the operations of 2020 may be performed by a repetition manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: identifying a set of component carriers supported by the UE for communications with a base station; receiving a downlink control message from the base station, the downlink control message scheduling multiple repetitions of a transport block for the UE, wherein a first repetition of the multiple repetitions is scheduled on a first component carrier of the set of component carriers and a second repetition of the multiple repetitions is scheduled on a second component carrier of the set of component carriers; and transmitting or receiving the first repetition via the first component carrier and the second repetition via the second component carrier.

Aspect 2: The method of aspect 1, further comprising: receiving an indication that the multiple repetitions of the transport block are scheduled via the first and second component carriers according to one or both of a frequency division multiplexing (FDM) scheme or a time division multiplexing (TDM) scheme.

Aspect 3: The method of aspect 2, wherein the indication is received via RRC signaling, a medium access control (MAC) control element (MAC-CE), or DCI.

Aspect 4: The method of any of aspects 1 through 3, further comprising: receiving an indication of a subset of the set of component carriers available for the multiple repetitions of the transport block, the subset comprising at least the first component carrier and the second component carrier, wherein the indication is received via RRC signaling, a medium access control (MAC) control element (MAC-CE), or DCI.

Aspect 5: The method of aspect 4, wherein the indication comprises a set of carrier indices that corresponds to the subset of the set of component carriers.

Aspect 6: The method of any of aspects 1 through 5, further comprising: receiving an indication of at least one component carrier of the set of component carriers to be dropped for the multiple repetitions of the transport block.

Aspect 7: The method of any of aspects 1 through 6, further comprising: receiving an indication of a starting component carrier for the multiple repetitions of the transport block.

Aspect 8: The method of any of aspects 1 through 7, further comprising: transmitting feedback for a subset of the set of component carriers; and receiving an indication of a starting component carrier for the multiple repetitions of the transport block based at least in part on the feedback, wherein the subset comprises the starting component carrier and the feedback indicates ACK/negative ACK (NACK) feedback or a signal to interference plus noise ratio (SINK) for each component carrier of the subset.

Aspect 9: The method of any of aspects 1 through 8, further comprising: receiving, via RRC signaling, a reference subcarrier spacing configuration for each of a subset of the set of component carriers; and determining a number of symbols between the downlink control message and transmission or reception of the first repetition via the first component carrier based at least in part on the reference subcarrier spacing configuration.

Aspect 10: The method of aspect 9, wherein the number of symbols is based at least in part on a minimum or a maximum slot format indicator of the subset, an indication within the downlink control message, a subcarrier spacing of the first component carrier, or a subcarrier spacing associated with the downlink control message.

Aspect 11: The method of any of aspects 1 through 10, further comprising: determining a first number of symbols between the downlink control message and transmission or reception of the first repetition via the first component carrier based at least in part on a subcarrier spacing of the first component carrier; and determining a second of symbols between the downlink control message and transmission or reception of the second repetition via the second component carrier based at least in part on a subcarrier spacing of the second component carrier.

Aspect 12: The method of any of aspects 1 through 11, further comprising: receiving, via RRC signaling, a reference subcarrier spacing configuration for each of a subset of the set of component carriers; and determining a slot for transmission or reception of the first repetition via the first component carrier based at least in part on the reference subcarrier spacing configuration.

Aspect 13: The method of any of aspects 1 through 12, further comprising: determining a first slot for transmission or reception of the first repetition via the first component carrier based at least in part on a subcarrier spacing of the first component carrier; and determining a second slot for transmission or reception of the second repetition via the second component carrier based at least in part on a subcarrier spacing of the second component carrier.

Aspect 14: The method of any of aspects 1 through 13, further comprising: receiving, via RRC signaling, a reference subcarrier spacing configuration for each of a subset of the set of component carriers; and determining a starting symbol and length in time for transmission or reception of the first repetition via the first component carrier based at least in part on the reference subcarrier spacing configuration, wherein the starting symbol and length in time is the same for the first component carrier and the second component carrier.

Aspect 15: The method of any of aspects 1 through 14, further comprising: determining a number of symbols for transmission or reception of the first repetition via the first component carrier, wherein the number of symbols is the same for the first component carrier and the second component carrier.

Aspect 16: The method of any of aspects 1 through 15, further comprising: determining a transport block size for transmission or reception of the first repetition via the first component carrier based at least in part on a nominal length in time and a nominal set of resource elements indicated by the downlink control message, wherein the transport block size is the same for the first component carrier and the second component carrier.

Aspect 17: The method of any of aspects 1 through 16, further comprising: determining a transport block size for transmission or reception of the first repetition via the first component carrier based at least in part on a nominal set of resource elements for the first component carrier and the second component carrier.

Aspect 18: A method for wireless communications at a base station, comprising: identifying a set of component carriers supported by a UE for communications with the base station; transmitting a downlink control message to the UE, the downlink control message scheduling multiple repetitions of a transport block for the UE, wherein a first repetition of the multiple repetitions is scheduled on a first component carrier of the set of component carriers and a second repetition of the multiple repetitions is scheduled on a second component carrier of the set of component carriers; and transmitting or receiving the first repetition via the first component carrier and the second repetition via the second component carrier.

Aspect 19: The method of aspect 18, further comprising: transmitting an indication that the multiple repetitions of the transport block are scheduled via the first and second component carriers according to one or both of a frequency division multiplexing (FDM) scheme or a time division multiplexing (TDM) scheme.

Aspect 20: The method of aspect 19, wherein the indication is transmitted via RRC signaling, a medium access control (MAC) control element (MAC-CE), or DCI.

Aspect 21: The method of any of aspects 18 through 20, further comprising: transmitting an indication of a subset of the set of component carriers available for the multiple repetitions of the transport block, the subset comprising at least the first component carrier and the second component carrier, wherein the indication is transmitted via RRC signaling, a medium access control (MAC) control element (MAC-CE), or DCI.

Aspect 22: The method of aspect 21, wherein the indication comprises a set of carrier indices that corresponds to the subset of the set of component carriers.

Aspect 23: The method of any of aspects 18 through 22, further comprising: transmitting an indication of at least one component carrier of the set of component carriers to be dropped for the multiple repetitions of the transport block.

Aspect 24: The method of any of aspects 18 through 23, further comprising: transmitting an indication of a starting component carrier for the multiple repetitions of the transport block.

Aspect 25: The method of any of aspects 18 through 24, further comprising: receiving, from the UE, feedback for a subset of the set of component carriers; and transmitting an indication of a starting component carrier for the multiple repetitions of the transport block based at least in part on the feedback, wherein the subset comprises the starting component carrier and the feedback indicates ACK/negative ACK (NACK) feedback or a signal to interference plus noise ratio (SINR) for each component carrier of the subset.

Aspect 26: The method of any of aspects 18 through 25, further comprising: transmitting, via RRC signaling, a reference subcarrier spacing configuration for each of a subset of the set of component carriers; scheduling transmission or reception of the first repetition via the first component carrier based at least in part on the reference subcarrier spacing configuration; and scheduling transmission or reception of the second repetition via the second component carrier based at least in part on the reference subcarrier spacing configuration.

Aspect 27: The method of any of aspects 18 through 26, further comprising: scheduling transmission or reception of the first repetition via the first component carrier based at least in part on a first subcarrier spacing configuration associated with the first component carrier; and scheduling transmission or reception of the second repetition via the second component carrier based at least in part on a second subcarrier spacing configuration associated with the second component carrier.

Aspect 28: The method of any of aspects 18 through 27, further comprising: scheduling transmission or reception of the first repetition via the first component carrier based at least in part on a subcarrier spacing configuration associated with the downlink control message.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a base station, comprising a processor; memory coupled with the processor; and instructions stored in the memory and executable by the processor to cause the apparatus to perform a method of any of aspects 18 through 28.

Aspect 33: An apparatus for wireless communications at a base station, comprising at least one means for performing a method of any of aspects 18 through 28.

Aspect 34: A non-transitory computer-readable medium storing code for wireless communications at a base station, the code comprising instructions executable by a processor to perform a method of any of aspects 18 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a downlink control message scheduling multiple repetitions of a transport block for the UE, wherein a first repetition of the multiple repetitions is scheduled on a first component carrier of a set of component carriers supported by the UE for communications and a second repetition of the multiple repetitions is scheduled on a second component carrier of the set of component carriers;
   receiving an indication that the multiple repetitions of the transport block are scheduled via the first component carrier and the second component carrier according to one or both of a frequency division multiplexing (FDM) scheme or a time division multiplexing (TDM) scheme; and
   communicating the first repetition via the first component carrier and the second repetition via the second component carrier.

2. The method of claim 1, wherein the indication that the multiple repetitions of the transport block are scheduled via the first component carrier and the second component carrier according to one or both of a FDM scheme or a TDM scheme is received via radio resource control (RRC) signaling, a medium access control (MAC) control element (MAC-CE), or downlink control information (DCI).

3. The method of claim 1, further comprising:
   receiving an indication of a subset of the set of component carriers available for the multiple repetitions of the transport block, the subset comprising at least the first component carrier and the second component carrier, wherein the indication is received via radio resource control (RRC) signaling, a medium access control (MAC) control element (MAC-CE), or downlink control information (DCI).

4. The method of claim 3, wherein the indication of the subset of the set of component carriers available for the multiple repetitions of the transport block comprises a set of carrier indices that corresponds to the subset of the set of component carriers.

5. The method of claim 1, further comprising:
   receiving an indication of at least one component carrier of the set of component carriers to be dropped for the multiple repetitions of the transport block.

6. The method of claim 1, further comprising:
   receiving an indication of a starting component carrier for the multiple repetitions of the transport block.

7. The method of claim 1, further comprising:
   transmitting feedback for a subset of the set of component carriers; and
   receiving an indication of a starting component carrier for the multiple repetitions of the transport block based at least in part on the feedback, wherein the subset comprises the starting component carrier and the feedback indicates acknowledgement (ACK)/negative ACK (NACK) feedback or a signal to interference plus noise ratio (SINR) for each component carrier of the subset.

8. The method of claim 1, further comprising:
   receiving, via radio resource control (RRC) signaling, a reference subcarrier spacing configuration for each of a subset of the set of component carriers; and
   determining a number of symbols between the downlink control message and communication of the first repetition via the first component carrier based at least in part on the reference subcarrier spacing configuration.

9. The method of claim 8, wherein the number of symbols is based at least in part on a minimum or a maximum slot format indicator of the subset, an indication within the downlink control message, a subcarrier spacing of the first component carrier, or a subcarrier spacing associated with the downlink control message.

10. The method of claim 1, further comprising:
determining a first number of symbols between the downlink control message and communication of the first repetition via the first component carrier based at least in part on a subcarrier spacing of the first component carrier; and
determining a second number of symbols between the downlink control message and communication of the second repetition via the second component carrier based at least in part on a subcarrier spacing of the second component carrier.

11. The method of claim 1, further comprising:
receiving, via radio resource control (RRC) signaling, a reference subcarrier spacing configuration for each of a subset of the set of component carriers; and
determining a slot for communication of the first repetition via the first component carrier based at least in part on the reference subcarrier spacing configuration.

12. The method of claim 1, further comprising:
determining a first slot for communication of the first repetition via the first component carrier based at least in part on a subcarrier spacing of the first component carrier; and
determining a second slot for communication of the second repetition via the second component carrier based at least in part on a subcarrier spacing of the second component carrier.

13. The method of claim 1, further comprising:
receiving, via radio resource control (RRC) signaling, a reference subcarrier spacing configuration for each of a subset of the set of component carriers; and
determining a starting symbol and length in time for communication of the first repetition via the first component carrier based at least in part on the reference subcarrier spacing configuration, wherein the starting symbol and length in time is the same for the first component carrier and the second component carrier.

14. The method of claim 1, further comprising:
determining a number of symbols for communication of the first repetition via the first component carrier, wherein the number of symbols is the same for the first component carrier and the second component carrier.

15. The method of claim 1, further comprising:
determining a transport block size for communication of the first repetition via the first component carrier based at least in part on a nominal length in time and a nominal set of resource elements indicated by the downlink control message, wherein the transport block size is the same for the first component carrier and the second component carrier.

16. The method of claim 1, further comprising:
determining a transport block size for communication of the first repetition via the first component carrier based at least in part on a nominal set of resource elements for the first component carrier and the second component carrier.

17. A method for wireless communications at a network device, comprising:
transmitting a downlink control message to a user equipment (UE), the downlink control message scheduling multiple repetitions of a transport block for the UE, wherein a first repetition of the multiple repetitions is scheduled on a first component carrier of a set of component carriers supported by the UE for communications with the network device and a second repetition of the multiple repetitions is scheduled on a second component carrier of the set of component carriers;
transmitting an indication that the multiple repetitions of the transport block are scheduled via the first component carrier and the second component carrier according to one or both of a frequency division multiplexing (FDM) scheme or a time division multiplexing (TDM) scheme; and
communicating the first repetition via the first component carrier and the second repetition via the second component carrier.

18. The method of claim 17, wherein the indication that the multiple repetitions of the transport block are scheduled via the first component carrier and the second component carrier according to one or both of a FDM scheme or a TDM scheme is transmitted via radio resource control (RRC) signaling, a medium access control (MAC) control element (MAC-CE), or downlink control information (DCI).

19. The method of claim 17, further comprising:
transmitting an indication of a subset of the set of component carriers available for the multiple repetitions of the transport block, the subset comprising at least the first component carrier and the second component carrier, wherein the indication is transmitted via radio resource control (RRC) signaling, a medium access control (MAC) control element (MAC-CE), or downlink control information (DCI).

20. The method of claim 19, wherein the indication of the subset of the set of component carriers available for the multiple repetitions of the transport block comprises a set of carrier indices that corresponds to the subset of the set of component carriers.

21. The method of claim 17, further comprising:
transmitting an indication of at least one component carrier of the set of component carriers to be dropped for the multiple repetitions of the transport block.

22. The method of claim 17, further comprising:
transmitting an indication of a starting component carrier for the multiple repetitions of the transport block.

23. The method of claim 17, further comprising:
receiving, from the UE, feedback for a subset of the set of component carriers; and
transmitting an indication of a starting component carrier for the multiple repetitions of the transport block based at least in part on the feedback, wherein the subset comprises the starting component carrier and the feedback indicates acknowledgement (ACK)/negative ACK (NACK) feedback or a signal to interference plus noise ratio (SINR) for each component carrier of the subset.

24. The method of claim 17, further comprising:
transmitting, via radio resource control (RRC) signaling, a reference subcarrier spacing configuration for each of a subset of the set of component carriers;
scheduling communication of the first repetition via the first component carrier based at least in part on the reference subcarrier spacing configuration; and
scheduling communication of the second repetition via the second component carrier based at least in part on the reference subcarrier spacing configuration.

25. The method of claim 17, further comprising:
scheduling communication of the first repetition via the first component carrier based at least in part on a first subcarrier spacing configuration associated with the first component carrier; and
scheduling communication of the second repetition via the second component carrier based at least in part on a second subcarrier spacing configuration associated with the second component carrier.

26. The method of claim 17, further comprising:
scheduling communication of the first repetition via the first component carrier based at least in part on a subcarrier spacing configuration associated with the downlink control message.

27. An apparatus for wireless communications at a user equipment (UE), comprising:
a processor,
memory coupled with the processor; and
instructions stored in the memory and executable by the processor to cause the apparatus to:
receive a downlink control message scheduling multiple repetitions of a transport block for the UE, wherein a first repetition of the multiple repetitions is scheduled on a first component carrier of a set of component carriers supported by the UE for communications and a second repetition of the multiple repetitions is scheduled on a second component carrier of the set of component carriers;
receive an indication that the multiple repetitions of the transport block are scheduled via the first component carrier and the second component carrier according to one or both of a frequency division multiplexing (FDM) scheme or a time division multiplexing (TDM) scheme; and
communicate the first repetition via the first component carrier and the second repetition via the second component carrier.

28. The apparatus of claim 27, wherein the indication that the multiple repetitions of the transport block are scheduled via the first component carrier and the second component carrier according to one or both of a FDM scheme or a TDM scheme is received via radio resource control (RRC) signaling, a medium access control (MAC) control element (MAC-CE), or downlink control information (DCI).

29. The apparatus of claim 27, wherein the instructions are further executable by the processor to cause the apparatus to:
receive an indication of a subset of the set of component carriers available for the multiple repetitions of the transport block, the subset comprising at least the first component carrier and the second component carrier, wherein the indication is received via radio resource control (RRC) signaling, a medium access control (MAC) control element (MAC-CE), or downlink control information (DCI).

30. An apparatus for wireless communications at a network device, comprising:
a processor,
memory coupled with the processor; and
instructions stored in the memory and executable by the processor to cause the apparatus to:
transmit a downlink control message to a user equipment (UE), the downlink control message scheduling multiple repetitions of a transport block for the UE, wherein a first repetition of the multiple repetitions is scheduled on a first component carrier of a set of component carriers supported by the UE for communications with the network device and a second repetition of the multiple repetitions is scheduled on a second component carrier of the set of component carriers;
transmit an indication that the multiple repetitions of the transport block are scheduled via the first component carrier and the second component carrier according to one or both of a frequency division multiplexing (FDM) scheme or a time division multiplexing (TDM) scheme; and
communicate the first repetition via the first component carrier and the second repetition via the second component carrier.

* * * * *